United States Patent [19]
Ogasawara et al.

[11] Patent Number: 5,953,317
[45] Date of Patent: Sep. 14, 1999

[54] POLICING CIRCUIT AND POLICING METHOD

[75] Inventors: Nobuo Ogasawara, Yokohama; Noboru Endo, Kodaira; Kazuho Miki, Koganei; Akihiko Takase, Tokyo, all of Japan

[73] Assignee: Hitachi, Ltd., Tokyo, Japan

[*] Notice: This patent is subject to a terminal disclaimer.

[21] Appl. No.: 08/682,955

[22] Filed: Jul. 18, 1996

Related U.S. Application Data

[63] Continuation of application No. 08/351,148, Nov. 30, 1994, Pat. No. 5,568,468.

[30] Foreign Application Priority Data

Dec. 6, 1993 [JP] Japan ................................ 5-304943

[51] Int. Cl.⁶ .............................. H04J 3/14; H04L 12/26
[52] U.S. Cl. ........................ 370/232; 370/233; 370/234
[58] Field of Search ................................ 370/229–235, 370/252, 395, 253

[56] References Cited

U.S. PATENT DOCUMENTS

| | | | |
|---|---|---|---|
| 5,301,184 | 4/1994 | Uriu et al. | 370/60.1 X |
| 5,359,593 | 10/1994 | Derby et al. | 370/17 |
| 5,402,412 | 3/1995 | Duffie et al. | 370/17 |
| 5,414,697 | 5/1995 | Osaki | 370/17 |
| 5,568,468 | 10/1996 | Ogasawara et al. | 370/13 |

FOREIGN PATENT DOCUMENTS

| | | |
|---|---|---|
| 02260939 | 10/1990 | Japan . |
| 5-48637 | 2/1993 | Japan . |
| 5-219093 | 8/1993 | Japan . |
| 05244189 | 9/1993 | Japan . |
| 6-178373 | 6/1994 | Japan . |
| 93/11622 | 6/1993 | WIPO . |

OTHER PUBLICATIONS

Ohm Publishing Co, Ltd, "Introduction to B–ISBN", pp. 44–50, Jan. 25, 1992.

ITU–T I.371 Recommendation, Section 3.2.3.7, COM XVIII–R 91E.

ATM User—Network Interface Specification, Version 2.2, pp. 298–303, Jun. 21, 1993.

Yamanaka et al., "Precise UPC Scheme Suitable for ATM Networks Characterized by Widely Ranging Traffic Parameter Values", IEICE Trans. Commun. vol. E75–B, No. 12, Dec. 1992, pp. 1367–1371.

*Primary Examiner*—Melvin Marcelo
*Attorney, Agent, or Firm*—Antonelli, Terry, Stout & Kraus, LLP

[57] ABSTRACT

Policing method and policing circuit for parallelly conducting a plurality of policing which are dependent on policing items in the policing for defining the traffic of an asynchronous transfer mode network are provided. A plurality of traffic monitor circuits 11 parallelly and independently conduct the traffic monitoring of a plurality of items for the input cell for the communication service to be provided by the asynchronous transfer mode network. Each monitor circuit monitors only the violation of the traffic independently and outputs the result. A total determination circuit determines whether to tag, discard or pass the input cell in accordance with a determination rule prescribed for the communication service based on a CLP value contained in a header of the input cell and the monitor result parallelly obtained from the respective monitor circuits to conduct the policing. Depending on the determination result, the traffic state of the input cell is updated by an update circuit or the result of the policing is outputted to other apparatus. The policing of the high speed complex communication service provided by the asynchronous transfer mode network having dependency between the monitor items of the traffic and the determination order is attained. A delay burden of the network is reduced by the speed-up of the policing.

39 Claims, 23 Drawing Sheets

FIG. 6

| | 1391 | 139(X) | 139(3) | 139(2) |
|---|---|---|---|---|
| | | MONITOR CLP | C1 | C0 |
| 139(X1) | | 0 | 0 | 0 |
| 139(X2) | | 1 | 0 | 1 |
| 139(X3) | | 0+1 | 1 | 0 |
| | | | 1 | 1 |

FIG. 7

| | 1392 | 139(Y) | 139(1) | 139(0) |
|---|---|---|---|---|
| | | DISCARD/TAG | DT1 | DT0 |
| 139(Y1) | | T1 | 0 | 0 |
| 139(Y2) | | T2 | 0 | 1 |
| 139(Y2) | | D1 | 1 | 0 |
| 139(Y4) | | D2 | 1 | 1 |

FIG. 8

TRUTH TABLE OF DETERMINATION CIRCUIT

| | | | | | | | | | | |
|---|---|---|---|---|---|---|---|---|---|---|
| | 1311 | 139(3) | 139(X) 139(2) | 139(1) | 139(Y) 139(0) | 21,134 12 | 31,134 132 | | 133 | 137 |

| DETERMINATION TYPE | INPUT | | | | | | OUTPUT | | | |
|---|---|---|---|---|---|---|---|---|---|---|
| | MONITOR CLP | | DISCARD/TAG | | CLP | UPC VIOLATION | CLP | TAG | DISCARD | UPDATE |
| | C1 | C0 | DT1 | DT0 | | | | | | |
| 0(T1) | 0 | 0 | 0 | 0 | 0 | 0 | 0 | 0 | 0 | 1 |
|  | 0 | 0 | 0 | 0 | 0 | 1 | 1 | 1 | 0 | 0 |
|  | 0 | 0 | 0 | 0 | 1 | 0 | 1 | 0 | 0 | 0 |
|  | 0 | 0 | 0 | 0 | 1 | 1 | 1 | 0 | 0 | 0 |
| 0(T2) | 0 | 0 | 0 | 1 | 0 | 0 | 0 | 0 | 0 | 1 |
|  | 0 | 0 | 0 | 1 | 0 | 1 | 1 | 1 | 0 | 0 |
|  | 0 | 0 | 0 | 1 | 1 | 0 | 1 | 0 | 1 | 0 |
|  | 0 | 0 | 0 | 1 | 1 | 1 | 1 | 0 | 1 | 0 |
| 0(D1) | 0 | 0 | 1 | 0 | 0 | 0 | 0 | 0 | 0 | 1 |
|  | 0 | 0 | 1 | 0 | 0 | 1 | 1 | 0 | 1 | 0 |
|  | 0 | 0 | 1 | 0 | 1 | 0 | 1 | 0 | 0 | 0 |
|  | 0 | 0 | 1 | 0 | 1 | 1 | 1 | 0 | 0 | 0 |
| 0(D2) | 0 | 0 | 1 | 1 | 0 | 0 | 0 | 0 | 0 | 1 |
|  | 0 | 0 | 1 | 1 | 0 | 1 | 1 | 0 | 1 | 0 |
|  | 0 | 0 | 1 | 1 | 1 | 0 | 1 | 0 | 1 | 0 |
|  | 0 | 0 | 1 | 1 | 1 | 1 | 1 | 0 | 1 | 0 |
| 1(T) | 0 | 1 | 0 | 0 | 0 | 0 | 0 | 0 | 0 | 0 |
|  | 0 | 1 | 0 | 0 | 0 | 1 | 0 | 0 | 0 | 0 |
|  | 0 | 1 | 0 | 0 | 1 | 0 | 1 | 0 | 0 | 0 |
|  | 0 | 1 | 0 | 0 | 1 | 1 | 1 | 0 | 0 | 0 |
| 1(D1) | 0 | 1 | 1 | 0 | 0 | 0 | 0 | 0 | 0 | 0 |
|  | 0 | 1 | 1 | 0 | 0 | 1 | 0 | 0 | 0 | 0 |
|  | 0 | 1 | 1 | 0 | 1 | 0 | 1 | 0 | 0 | 1 |
|  | 0 | 1 | 1 | 0 | 1 | 1 | 1 | 0 | 1 | 0 |
| 1(D2) | 0 | 1 | 1 | 1 | 0 | 0 | 1 | 0 | 1 | 0 |
|  | 0 | 1 | 1 | 1 | 0 | 1 | 1 | 0 | 1 | 0 |
|  | 0 | 1 | 1 | 1 | 1 | 0 | 1 | 0 | 0 | 1 |
|  | 0 | 1 | 1 | 1 | 1 | 1 | 1 | 0 | 1 | 0 |
| 0+1(T1) | 1 | 0 | 0 | 0 | 0 | 0 | 0 | 0 | 0 | 1 |
|  | 1 | 0 | 0 | 0 | 0 | 1 | 1 | 1 | 0 | 1 |
|  | 1 | 0 | 0 | 0 | 1 | 0 | 1 | 0 | 0 | 1 |
|  | 1 | 0 | 0 | 0 | 1 | 1 | 1 | 0 | 0 | 1 |
| 0+1(T2) | 1 | 0 | 0 | 1 | 0 | 0 | 0 | 0 | 0 | 1 |
|  | 1 | 0 | 0 | 1 | 0 | 1 | 1 | 1 | 0 | 1 |
|  | 1 | 0 | 0 | 1 | 1 | 0 | 1 | 0 | 0 | 1 |
|  | 1 | 0 | 0 | 1 | 1 | 1 | 1 | 0 | 1 | 0 |
| 0+1(D) | 1 | 0 | 1 | 0 | 0 | 0 | 0 | 0 | 0 | 1 |
|  | 1 | 0 | 1 | 0 | 0 | 1 | 1 | 0 | 1 | 0 |
|  | 1 | 0 | 1 | 0 | 1 | 0 | 1 | 0 | 0 | 1 |
|  | 1 | 0 | 1 | 0 | 1 | 1 | 1 | 0 | 1 | 0 |
| OTHERS | | | | | | | 0 | 0 | 0 | 0 |

FIG. 9

TRUTH TABLE OF UPDATE CIRCUIT

| | 1311 | 139(3) | 139(X) 139(2) | 139(1) | 139(Y) 139(0) | 137 | 32 | 33 | OUTPUT 14 |
|---|---|---|---|---|---|---|---|---|---|
| | | | | INPUT | | | | | |
| DETERMINATION TYPE | MONITOR CLP | | DISCARD/TAG | | | UPDATE | TAG T | DISCARD T | UPDATE |
| | C1 | C0 | DT1 | DT0 | | | | | |
| 0(T1) | 0 | 0 | 0 | 0 | | 0 | 0 | 0 | 0 |
| | 0 | 0 | 0 | 0 | | 0 | 0 | 1 | 0 |
| | 0 | 0 | 0 | 0 | | 0 | 1 | 0 | 0 |
| | 0 | 0 | 0 | 0 | | 0 | 1 | 1 | 0 |
| | 0 | 0 | 0 | 0 | | 1 | 0 | 0 | 1 |
| | 0 | 0 | 0 | 0 | | 1 | 0 | 1 | 0 |
| | 0 | 0 | 0 | 0 | | 1 | 1 | 0 | 0 |
| | 0 | 0 | 0 | 0 | | 1 | 1 | 1 | 0 |
| 0(T2) | 0 | 0 | 0 | 1 | | 0 | 0 | 0 | 0 |
| | 0 | 0 | 0 | 1 | | 0 | 0 | 1 | 0 |
| | 0 | 0 | 0 | 1 | | 0 | 1 | 0 | 0 |
| | 0 | 0 | 0 | 1 | | 0 | 1 | 1 | 0 |
| | 0 | 0 | 0 | 1 | | 1 | 0 | 0 | 1 |
| | 0 | 0 | 0 | 1 | | 1 | 0 | 1 | 0 |
| | 0 | 0 | 0 | 1 | | 1 | 1 | 0 | 0 |
| | 0 | 0 | 0 | 1 | | 1 | 1 | 1 | 0 |
| 0(D1) | 0 | 0 | 1 | 0 | | 0 | 0 | 0 | 0 |
| | 0 | 0 | 1 | 0 | | 0 | 0 | 1 | 0 |
| | 0 | 0 | 1 | 0 | | 0 | 1 | 0 | 0 |
| | 0 | 0 | 1 | 0 | | 0 | 1 | 1 | 0 |
| | 0 | 0 | 1 | 0 | | 1 | 0 | 0 | 1 |
| | 0 | 0 | 1 | 0 | | 1 | 0 | 1 | 0 |
| | 0 | 0 | 1 | 0 | | 1 | 1 | 0 | 0 |
| | 0 | 0 | 1 | 0 | | 1 | 1 | 1 | 0 |
| 0(D2) | 0 | 0 | 1 | 1 | | 0 | 0 | 0 | 0 |
| | 0 | 0 | 1 | 1 | | 0 | 0 | 1 | 0 |
| | 0 | 0 | 1 | 1 | | 0 | 1 | 0 | 0 |
| | 0 | 0 | 1 | 1 | | 0 | 1 | 1 | 0 |
| | 0 | 0 | 1 | 1 | | 1 | 0 | 0 | 1 |
| | 0 | 0 | 1 | 1 | | 1 | 0 | 1 | 0 |
| | 0 | 0 | 1 | 1 | | 1 | 1 | 0 | 0 |
| | 0 | 0 | 1 | 1 | | 1 | 1 | 1 | 0 |
| 1(T) | 0 | 1 | 0 | 0 | | 0 | 0 | 0 | 0 |
| | 0 | 1 | 0 | 0 | | 0 | 0 | 1 | 0 |
| | 0 | 1 | 0 | 0 | | 0 | 1 | 0 | 0 |
| | 0 | 1 | 0 | 0 | | 0 | 1 | 1 | 0 |
| | 0 | 1 | 0 | 0 | | 1 | 0 | 0 | 1 |
| | 0 | 1 | 0 | 0 | | 1 | 0 | 1 | 0 |
| | 0 | 1 | 0 | 0 | | 1 | 1 | 0 | 1 |
| | 0 | 1 | 0 | 0 | | 1 | 1 | 1 | 0 |

FIG. 10

TRUTH TABLE OF UPDATE CIRCUIT

| DETERMINATION TYPE | MONITOR CLP C1 (1311) | MONITOR CLP C0 (139(3)) | DISCARD/TAG DT1 (139(2)) | DISCARD/TAG DT0 (139(1)) | UPDATE (139(0)) | TAG T (32) | DISCARD T (33) | UPDATE (14) |
|---|---|---|---|---|---|---|---|---|
| 1 (D1) | 0 | 1 | 1 | 0 | 0 | 0 | 0 | 0 |
|  | 0 | 1 | 1 | 0 | 0 | 0 | 1 | 0 |
|  | 0 | 1 | 1 | 0 | 0 | 1 | 0 | 0 |
|  | 0 | 1 | 1 | 0 | 0 | 1 | 1 | 0 |
|  | 0 | 1 | 1 | 0 | 1 | 0 | 0 | 1 |
|  | 0 | 1 | 1 | 0 | 1 | 0 | 1 | 0 |
|  | 0 | 1 | 1 | 0 | 1 | 1 | 0 | 1 |
|  | 0 | 1 | 1 | 0 | 1 | 1 | 1 | 0 |
| 1 (D2) | 0 | 1 | 1 | 1 | 0 | 0 | 0 | 0 |
|  | 0 | 1 | 1 | 1 | 0 | 0 | 1 | 0 |
|  | 0 | 1 | 1 | 1 | 0 | 1 | 0 | 0 |
|  | 0 | 1 | 1 | 1 | 0 | 1 | 1 | 0 |
|  | 0 | 1 | 1 | 1 | 1 | 0 | 0 | 1 |
|  | 0 | 1 | 1 | 1 | 1 | 0 | 1 | 0 |
|  | 0 | 1 | 1 | 1 | 1 | 1 | 0 | 1 |
|  | 0 | 1 | 1 | 1 | 1 | 1 | 1 | 0 |
| 0+1 (T1) | 1 | 0 | 0 | 0 | 0 | 0 | 0 | 0 |
|  | 1 | 0 | 0 | 0 | 0 | 0 | 1 | 0 |
|  | 1 | 0 | 0 | 0 | 0 | 1 | 0 | 0 |
|  | 1 | 0 | 0 | 0 | 0 | 1 | 1 | 0 |
|  | 1 | 0 | 0 | 0 | 1 | 0 | 0 | 1 |
|  | 1 | 0 | 0 | 0 | 1 | 0 | 1 | 0 |
|  | 1 | 0 | 0 | 0 | 1 | 1 | 0 | 1 |
|  | 1 | 0 | 0 | 0 | 1 | 1 | 1 | 0 |
| 0+1 (T2) | 1 | 0 | 0 | 1 | 0 | 0 | 0 | 0 |
|  | 1 | 0 | 0 | 1 | 0 | 0 | 1 | 0 |
|  | 1 | 0 | 0 | 1 | 0 | 1 | 0 | 0 |
|  | 1 | 0 | 0 | 1 | 0 | 1 | 1 | 0 |
|  | 1 | 0 | 0 | 1 | 1 | 0 | 0 | 1 |
|  | 1 | 0 | 0 | 1 | 1 | 0 | 1 | 0 |
|  | 1 | 0 | 0 | 1 | 1 | 1 | 0 | 1 |
|  | 1 | 0 | 0 | 1 | 1 | 1 | 1 | 0 |
| 0+1 (D) | 1 | 0 | 1 | 0 | 0 | 0 | 0 | 0 |
|  | 1 | 0 | 1 | 0 | 0 | 0 | 1 | 0 |
|  | 1 | 0 | 1 | 0 | 0 | 1 | 0 | 0 |
|  | 1 | 0 | 1 | 0 | 0 | 1 | 1 | 0 |
|  | 1 | 0 | 1 | 0 | 1 | 0 | 0 | 1 |
|  | 1 | 0 | 1 | 0 | 1 | 0 | 1 | 0 |
|  | 1 | 0 | 1 | 0 | 1 | 1 | 0 | 1 |
|  | 1 | 0 | 1 | 0 | 1 | 1 | 1 | 0 |
| OTHERS |  |  |  |  |  |  |  | 0 |

FIG. 11

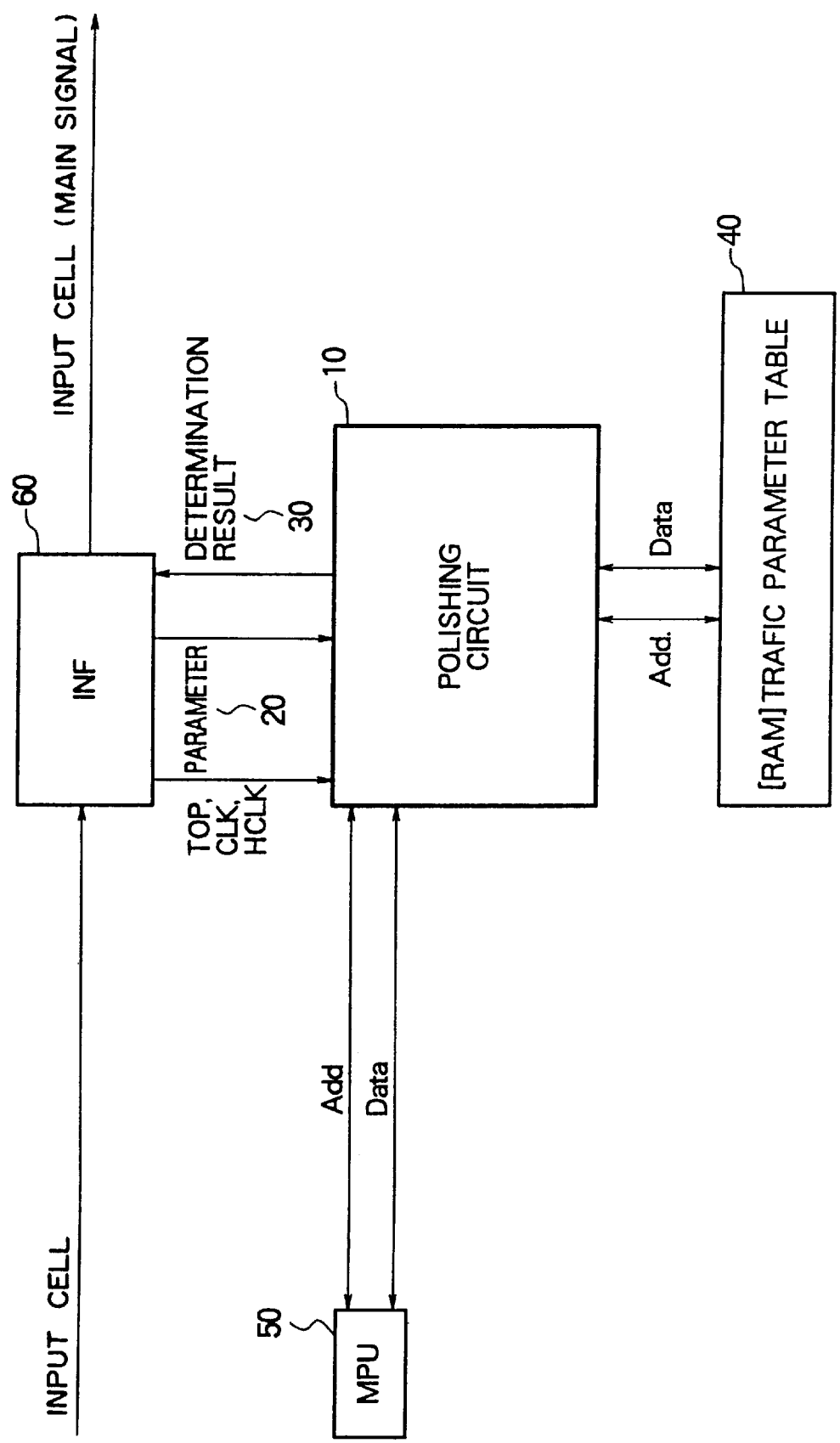

POLICING CIRCUIT AND POLICING METHOD

This is a continuation of application Ser. No. 08/351,148, filed Nov. 30, 1994, now U.S. Pat. No. 5,568,468.

BACKGROUND OF THE INVENTION

The present invention relates to a communication apparatus which uses packet communication or asynchronous transfer mode (ATM), and more particularly to policing circuit and method for monitoring and controlling a traffic parameter for securing a communication quality of a communication network.

In an ATM communication network, as shown in "B-ISDN Communication Rate and Support of Burst Information Source", Para.2.2 of "Introduction to B-ISDN", Ohm Publishing Co., Ltd., Jan. 25, 1992, pages 44–50, multiplication of static information based on the traffic of an information source has been used. In an ATM communication network suitable for wide area communication, versatile information sources such as sound, image and data are accommodated, and the nature that a quantity of information of the information sources generated in traffic varies in time is utilized. Accordingly, in the prior art communication network represented by a line exchange network, it is necessary to allocate an intra-network band at a maximum velocity of the occurrence of information of the information source while in the ATM communication network, the effective utilization of the communication network is attained by allocating the intra-network band at or near an average information rate. In order to attain such static multiplication, the information source declare, at the time of calling, a traffic characteristic (traffic parameter) thereof. The network calculates a capacity of the communication network to be allocated to the information source based thereon, and if acceptance of the call is permitted, the communication is permitted to the information source.

In the ATM communication network, an identifier of a cell loss quality (cell loss priority: CLP) is provided in a header of an ATM cell, and a service with a high cell loss priority (CLP=0) and a service with a low cell loss priority (CLP=1) are provided to control the traffic to attain effective utilization of the communication network.

Further, in the Recommendation I-371 defined by ITU-T, when a cell sent from a user to the ATM network violates the traffic parameter which the user has declared, one of two actions may be taken, that is, the cells is discarded or the CLP of the cell is changed from 0 to 1 and then the communication is permitted (hereinafter referred to as tagging). When the tagging is conducted, the cell inputted with CLP=0 is changed to CLP=1 and the communication is continued. In one example thereof, as shown in "Relationship Between UPC/NPC Actions, Cell Loss Priority and Network performance", Para. 3.2.3.7 of the ITU-T I-371 Recommendation, the cell rate of the cell is monitored with CLP=0, and if it violates the traffic parameter, the violating cell is tagged, and then the cell rate is again monitored with CLP=1 to continue the process. Namely, for the ATM communication network, whether the communication source sends the information in accordance with the declared traffic or not is continuously monitored during the communication, and if it violates, the traffic is tagged or discarded to attain normal static multiplication. This function is referred to as policing or usage parameter control (UPC). Policing circuit and method are disclosed in JP-A-5-219093 (laid-opened on Aug. 27, 1993, and filed in the U.S. as U.S. Ser. No. 8/13398 on Feb. 4, 1993 now U.S. Pat. No. 5,828,654). It is also disclosed in JP-A-5-48637 (laid-opened on Feb. 26, 1993).

In the policing, the ATM communication network with minimum discarding of cell may be attained by tagging, but the number of items for monitoring the traffic is plural in accordance with the content of the communication service provided in the communication network and the order to determine the plurality of results of monitoring is defined. Namely, the plurality of traffic parameters are dependent on the monitor items and the order. For example, in a frame relay service (FRS) described in ATM User-Network Interface Specification Version 2.2, Jun. 21, 1993, The ATM Forum Working Draft, a peak rate of a cell is first monitored independently from the CLP value, and if there is no violation in the traffic parameter, an average rate of the cell is monitored for CLP=0 and CLP=1, respectively. If there is violation in the average rate of the cell for CLP=0, tagging is made to CLP=1 to monitor the average rate. (Detail will be described in the following embodiment in connection with an example of communication service using the policing of the present invention.)

In realizing the communication service which conducts the above policing, since the traffic monitor items and the determination order thereof are dependent on each other, is simpler to rearrange the plurality of traffic parameters in the determination order to monitor them sequentially in time. For example, when the communication service having the dependency relation as shown in FIG. 22 is to be realized, it may me attained by serially connecting the monitor processing units A, B and C corresponding to the traffic parameters as shown in FIG. 23. However, in an actual apparatus, since the monitor processing units A, B and C require arithmetic operations and the processing is complex, a processing time is longer than a processing time of a final stage determination unit D. Thus, when they are processed serially, the cell delay increases in realizing the communication service. Accordingly, the more complex the dependency of the traffic parameters is, the more serious is the increase of the delay. Further, as the processing time in each monitor processing unit increases, a buffer memory for holding the cells is required. Namely, the method for serially monitoring and processing the traffic parameters is not optimum for the method of economically realizing the high speed communication service such as the ATM communication network. As described in the above-mentioned ATM Forum Working Draft, the monitor items and the dependency of the policing change in accordance with the ATM communication service to which the cells belong. For example, in a constant bit rate service, when a cell is inputted to a policing circuit, only the peak cell rate of CLP=0 may be policed, but in a frame relay service, when the cell is inputted to the policing circuit, all cells belonging to the connection are monitored at the peak cell rate without regard to the CLP value and a violating cell is discarded. For the cells not discarded during the monitor, the cells of CLP=0 are monitored at an average cell rate of CLP=0 when they are inputted to the policing circuit and the violating cells are tagged. For the cells tagged during the monitor and the cells for which the violation was not detected in the monitor at the peak cell rate for CLP=1, they are polished at the average cell rate for CLP=1. Namely, in the ATM communication, it is required to change the dependency between the number of monitor items and the monitor items in accordance with various services. However, if it is attempted to realize all of them by the change of physical connection of the monitoring circuit, it leads to the increase of hardware.

SUMMARY OF THE INVENTION

It is an object of the present invention to provide policing circuit and policing method suitable for solving the above problems in the ATM communication network which conduct the policing.

More particularly, it is an object of the present invention to provide policing circuit and policing method which attain a communication service having dependency of a plurality of traffic parameters while suppressing the increase of cell delay in the ATM communication network.

It is other object of the present invention to provide policing circuit and policing method which attain the communication service having the dependency of the plurality of traffic parameters with less hardware.

It is a further object of the present invention to provide policing circuit and method which can readily provide an ATM apparatus which provides multiple of services compatible to various ATM communication services by merely changing the dependency between the number of monitor items and the monitor items. In changing the dependency, it is an object to realize the policing circuit which can change the dependency between the number of monitor items and the monitor items without increasing the hardware.

It is a further object of the present invention to provide a policing circuit which attains the change of the dependency between the number of monitor items and the monitor items in the policing circuit with simple handling and control by merely changing by an external signal or command, or changing a control parameter having memory means represented by a table or a memory in the circuit. In other words, it is an object to provide a policing circuit which eliminates the need to change the hardware configuration such as rearrangement or reconnection of the hardware. Namely, it is an object to provide a policing circuit which is applicable to various ATM apparatus and has a high applicability. More specifically, it is an object to provide a policing circuit suitable for building into an IC or LSI circuit or for an IC or LSI which conducts the policing.

In order to achieve the above objects, in the policing circuit of the present invention, in the policing of the ATM communication apparatus for providing various ATM communication services, a plurality of monitor units corresponding to a plurality of monitor items are arranged in parallel in accordance with the items of the communication service independently from the dependency thereof, and the monitor units independently monitor the input cell traffic to the ATM communication apparatus. A total determination unit comprising a determination unit which determines in accordance with a decision rule defined for the communication service based on the parallelly produced monitor results and the input cell CLP's, and an update unit for updating a current traffic state which is a monitor parameter of the traffic in accordance with the determination result is provided independently from the plurality of monitor units, and the dependency of the monitor items and the order are centrally processed thereby to determine whether the input cell is left as it is, tagged or discard, and update the traffic state.

The policing circuit for attaining the policing method comprises a number of monitor circuits for monitoring only whether the traffic parameter (current traffic state) violates the user declared traffic or not for the input cell of the ATM communication apparatus, as many monitor circuits as needed to correspond to the number of monitor items varying with the communication service in parallel and independently operably arranged, and a total determination unit including a determination circuit unit having a plurality of determination circuits connected in cascade in accordance with the dependency of the monitor items. The determination circuits determining in accordance with a decision rule defined for the communication service for the monitor result and the input cell CLP's, that is, a rule defining whether the input cell is to be tagged or discarded when the traffic violation occurs for each ATM connection, and an update unit having a plurality of update circuits connected in cascade for updating the traffic parameter (current traffic state) based on the determination results for the respective determination circuits.

In the policing circuit, as many monitoring circuit, determination circuits and update circuits as are necessary to comply with the number of items of policing which varies from communication service to communication service are provided and the dependency of the monitor items and the order is set by merely setting in each circuit the items necessary for the monitor, determination and update operations for various communication services and the operation parameters to conduct the policing for the communication service are determined and stored in parameter memory means. On the other hand, the operation parameters for the communication service are selected from the memory means and set in the respective circuits. Namely, since each circuit is of the identical circuit configuration, the operation parameters necessary for the policing are selected from the memory means and set in the circuits to constrict the circuit for conducting the monitoring, determination and updating corresponding to the communication service. A dummy operation parameter which prevents the circuit which is not used when the number of items of policing is small from malfunctioning is also defined and a non-operating circuit is set by using this parameter.

The operation necessary for the policing is divided to the monitor unit, the determination unit and the update unit independently and the monitor unit independently and parallelly monitors a plurality of traffic monitor items for the communication service. Thus, while there is dependency between the monitor items and the determination order in the policing, the monitoring execution time does not increase with the number of items and the monitoring process with a short process time is attained. Further, since it is not necessary to sequentially process all items of the input cell, the hold means such as a buffer memory can be reduced and the policing is attained with an economic configuration.

The processing is done centrally in the determination means and the update means. Thus, independently from the traffic monitoring which involves a long processing time for the arithmetic operation and has a complex configuration, the determination as to whether the input cell is processed as it is, tagged or discarded and the updating of the traffic state can be attained by only a simple logic operation in a short time. The processing of the dependency of the monitor items and the order for the communication service need only the modification of the configuration of the determination unit and the update unit and the policing for various communication services is facilitated.

Since as many monitor circuits, determination circuits and update circuits of the identical circuit configurations in the policing circuit as are necessary to comply with the number of items of various policing are provided and interconnected, the circuit configuration is simple and can be readily implemented economically by an LSI. Further, by merely selecting and setting the operation parameters necessary for the monitoring, determination and updating for the communication service, the dependency of the monitor items and the order is set and the policing for the communication service can be conducted. Accordingly, the policing circuit suitable for the LSI implementation which can comply with various communication services without changing the hardware and the reconnection or addition of the circuits is attained.

The operation parameters are stored in the memory means and the parameters are selected and set in the circuits in accordance wit the communication service. Thus, one policing circuit may be used in the communication apparatus which provides various communication services and various policing may be conducted by merely changing the setting in accordance with the service. Accordingly, the ATM communication apparatus which is easy to handle and economic is attained. Even if the addition of the content of the policing occurs due to the addition of the service or the change in the content of the policing, it can be readily complied by updating or additionally writing the operation parameters which is the content of the memory means, and the ATM communication apparatus which can provide various communication services is attained. Namely, the policing method and policing circuit as well as the ATM communication apparatus of flexible and economic configuration which are compatible to not only the policing for the ATM communication services described in the ATM Forum Working Draft but also the ATM communication services which may be required in future, without changing the hardware is attained.

BRIEF DESCRIPTION OF THE DRAWINGS

FIG. 6 shows detailed states of a monitor CLP identifier, FIG. 7 shows detailed states of a discard/tag identifier, FIG. 8 shows a truth table for illustrating a logical operation of the determination circuit of the policing circuit of the present invention, FIG. 9 shows a truth table (1/2) for illustrating a logical operation of an update circuit of the policing circuit of the present invention, FIG. 10 shows a truth table (2/2) for illustrating a logical operation of the update circuit of the policing circuit of the present invention, FIG. 11 shows a pattern chart showing types (patterns) of determination conducted by the determination circuit 131 of the policing circuit of the present invention, FIG. 28 shows a block diagram of a configuration of an ATM communication apparatus having an LSI policing circuit in the ATM communication apparatus shown in FIG. 1.

DESCRIPTION OF THE PREFERRED EMBODIMENTS

The embodiments of the policing circuit and policing method of the present invention are now explained with reference to the accompanying drawings.

Figure 1:
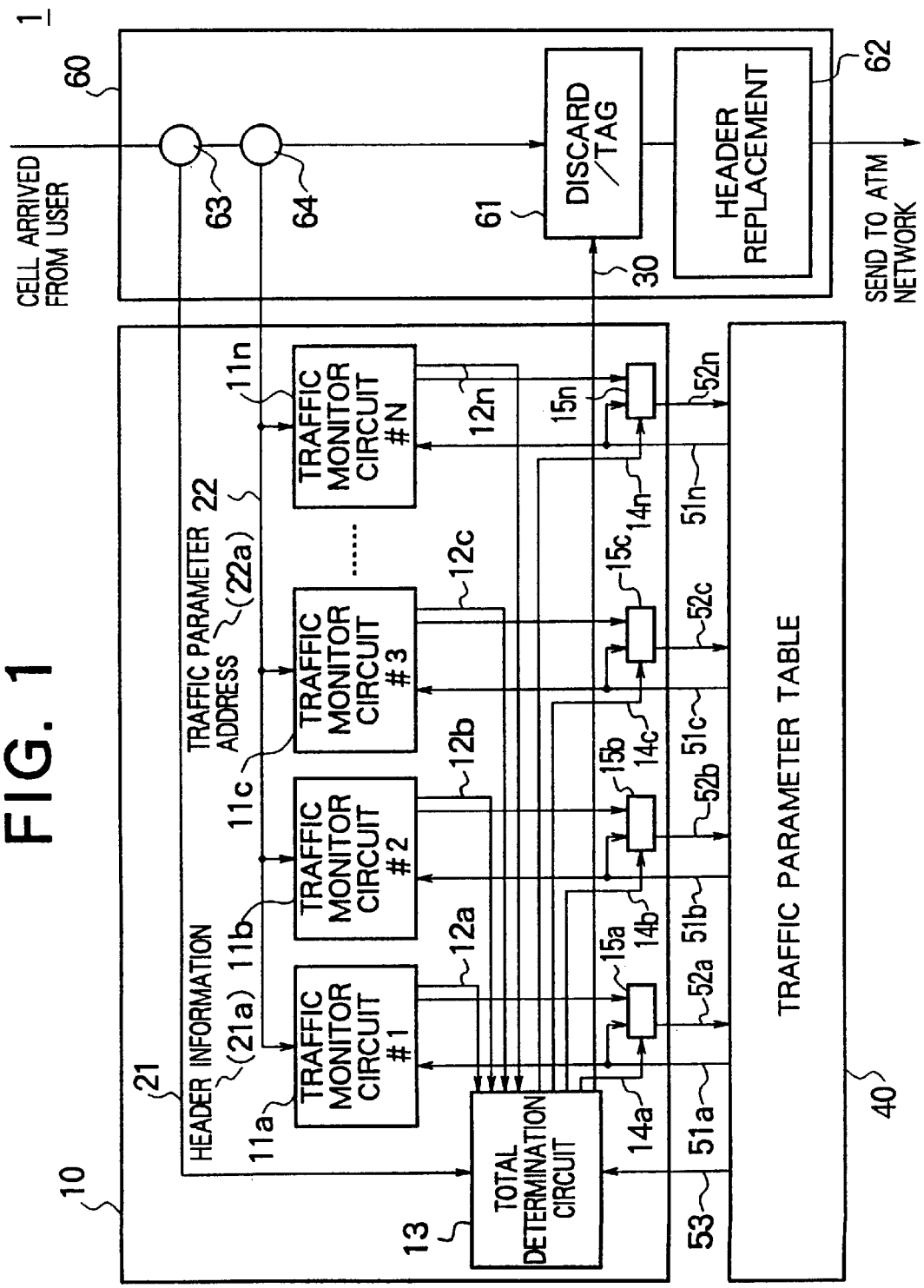
FIG. 1 shows a block diagram of a configuration of an ATM communication apparatus having a policing circuit of the present invention.

FIG. 1 shows a block diagram of a configuration of an ATM communication apparatus which uses the policing circuit of the present invention. The ATM communication apparatus comprises an interface unit 60 (hereinafter referred to as INF) for connecting a user to a communication network in an ATM communication network, a policing circuit 10 for conducting the policing for various communication services for a cell arrived from the user, and a traffic parameter table 40 for holding traffic parameters such as a declared value of permissible traffic capacity of an ATM connection to which the arriving cell belongs, a traffic state of a current ATM connection, and traffic monitor items and a monitor determination order in accordance with the communication service, which are required to conduct the policing in the policing circuit.

In order to monitor whether a violation is included or not in the traffic of the cell arrived from the user at a traffic parameter address 22a acquired from a traffic parameter extract point 64 of INF 60 through an input line 22, the policing circuit 10 comprises a plurality of parallel traffic monitor circuits 11 (11a≠11n), one for each of the traffic monitor items for the communication service, and a total determination circuit 13 for determining a state after the traffic monitor of the cell by a CLP 21a included in header information acquired from the outputs of the monitor circuits 11 (11a≠11n) and a CLP extract point 63 of the INF 60 through an input line 21 and determining whether the cell which arrives from the user to the INF 60 and is sent to the ATM communication network is to be tagged or discarded. Each of the monitor circuits 11 (11a≠11n) outputs a monitor result 12 (12a≠12n) representing whether the arriving cell violates the declared value of the traffic parameter in accordance with the permissible traffic value and the current traffic state to which the cell belongs and read from the traffic parameter table 40 through signal lines 51 (51a≠51n). Specifically, the monitor circuits 11 (11a≠11n) are constructed, for example, by a leaky bucket method, a T-X method or a dangerous bridge method as disclosed in "Precise UPC Scheme Suitable for ATM Networks Characterized by Widely Ranging Traffic Parameter Values", IEICE Trans., Commun. Vol. E75-B, No. 12 December 1992, pages 1367≠1371. The total determination circuit 13 determines based on the input CLP's 21a and the monitor results of the monitor circuits 11 (11a≠11n) and the traffic monitor items and the monitor determination order (hereinafter referred to as a monitor state item 139 a detail of which will described later) for the communication service read from the traffic parameter table 40 through a signal line 53, and sends a determination result signal 30 to a cell passage determination point 61 of the INF 60 connected to the policing circuit 10 and also determines whether to update the traffic parameter (current traffic state) of the traffic parameter table 40, and when the traffic parameter is to be updated, it updates the traffic parameter of the traffic parameter table 40 through selectors 15 (15a≠15n) and buses 52 (52a≠52n).

In the policing, the cell arrived from the user is tagged or discarded in accordance with the determination result signal 30 from the policing circuit 10 at the cell passage determination point 61 of the INF 60, and a header of the cell is replaced by header replacement 62 and it is sent out to the ATM communication network.

Figure 2:
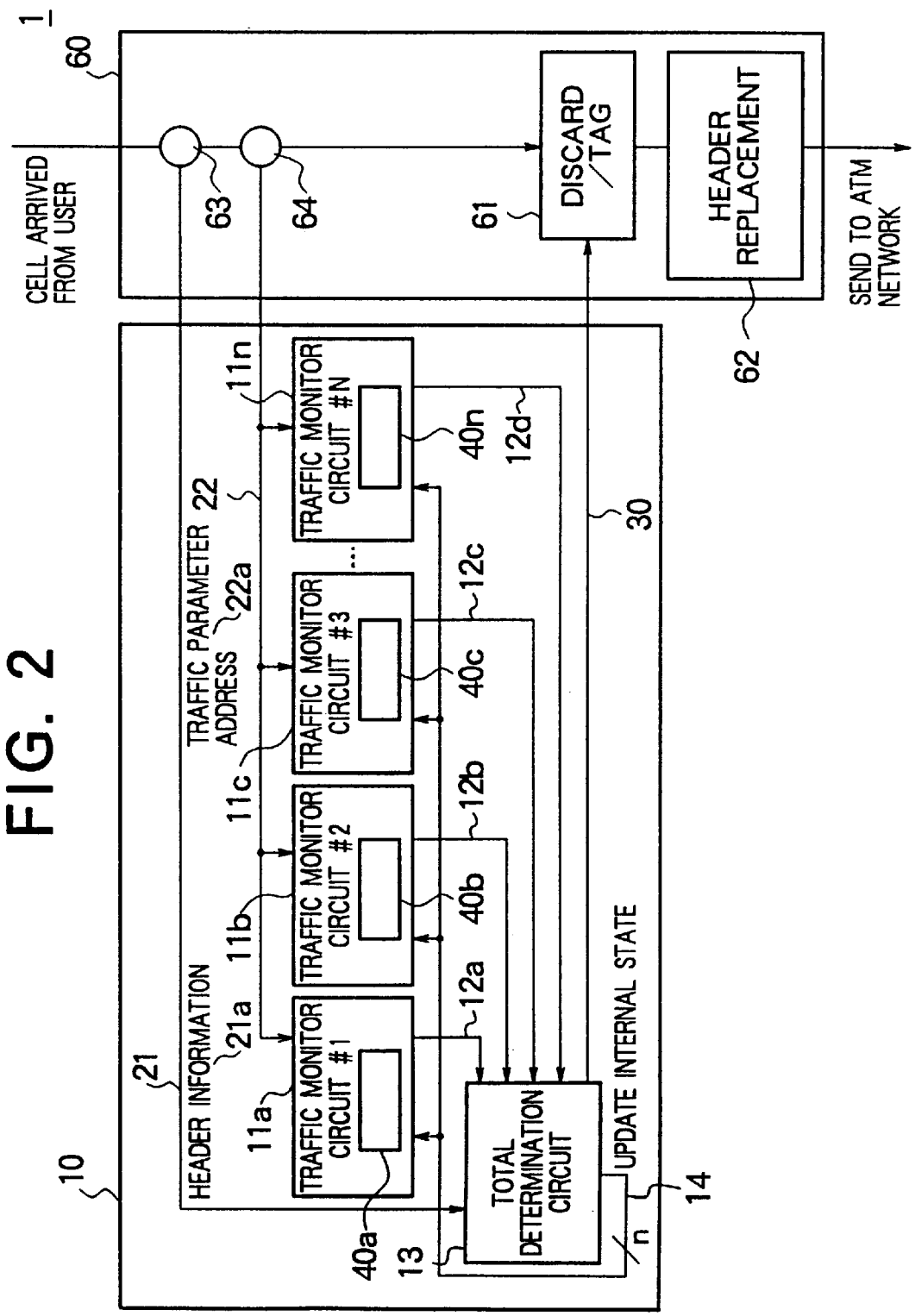
FIG. 2 shows a block diagram of a configuration of an ATM communication apparatus having another policing circuit of the present invention.

In the present embodiment, the traffic parameter table 40 is an external circuit of the policing circuit 10 although the traffic parameter table 40 may be provided in the policing circuit 10 as shown in a block diagram of the policing circuit 10 of other configuration of the ATM communication apparatus using the policing circuit of the present invention as shown in FIG. 2.

Figure 3:
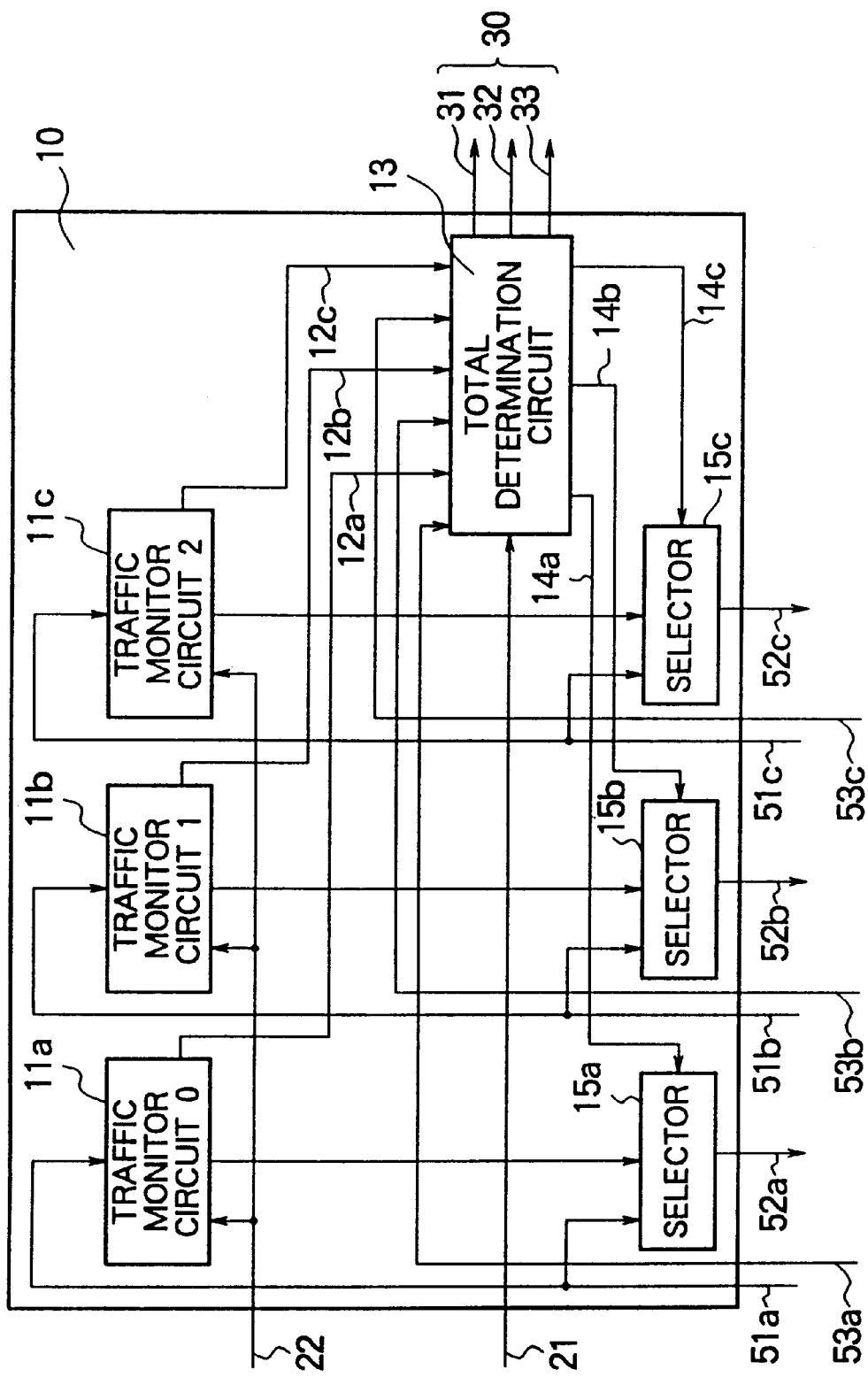
FIG. 3 shows a block diagram of a configuration of a policing circuit of the present invention which uses three traffic monitor circuits.
Figure 4:
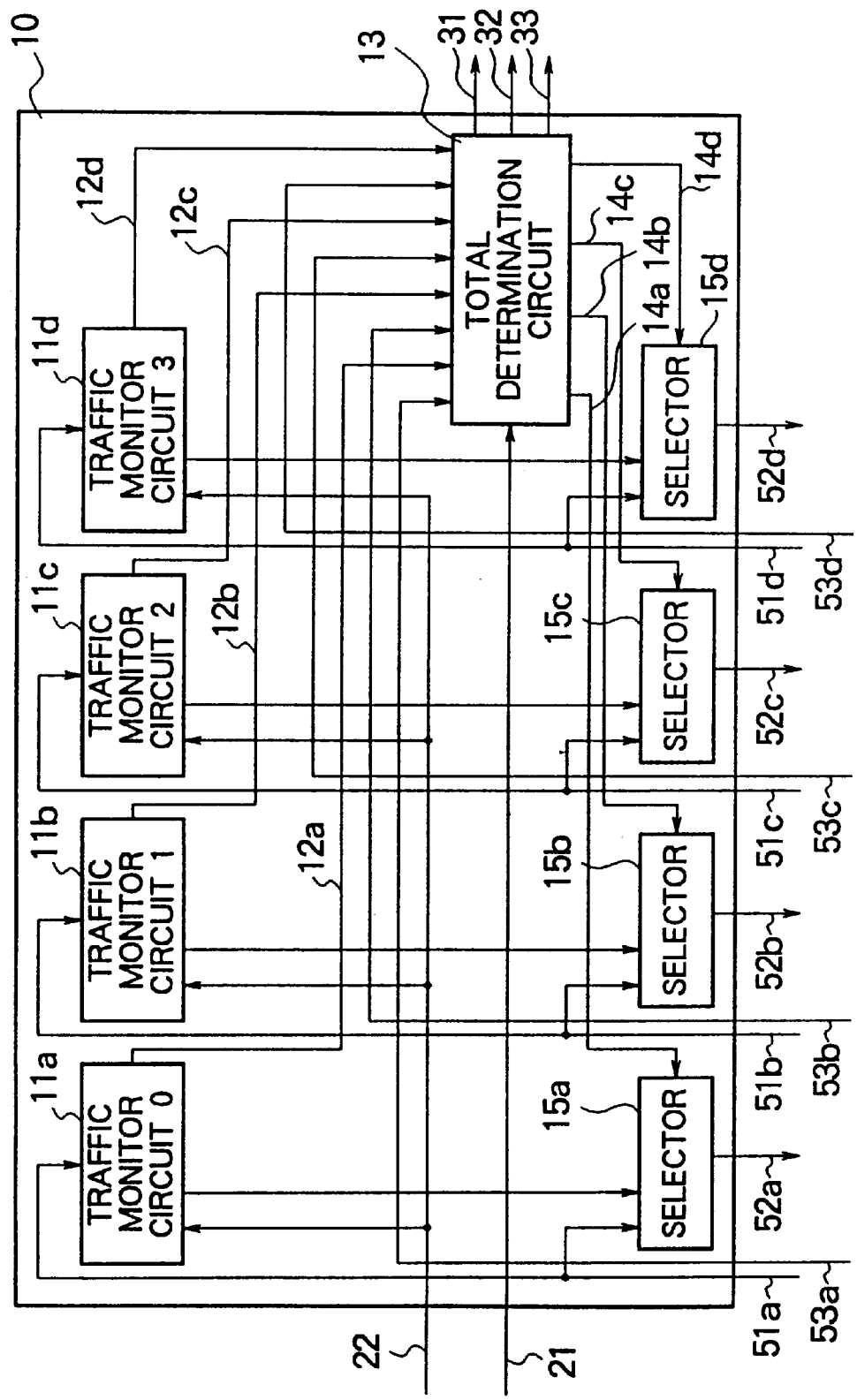
FIG. 4 shows a block diagram of another configuration of a policing circuit of the present invention which uses four traffic monitor circuits.

FIGS. 3 and 4 show block diagrams of detailed configurations of the policing circuit 10 shown in the embodiment of FIG. 1, and FIG. 3 shows the configuration of the policing circuits 10 having three monitor circuit 11 arranged in parallel and FIG. 4 shows the configuration of the policing circuit 10 having four monitor circuits 11 arranged in parallel. It should be understood that in the policing method and policing circuit of the present invention, a plurality of monitor circuits 11 are arranged in parallel in accordance with the content of the communication service and another number of monitor circuits 11 than the number shown in the present embodiment may be arranged in parallel. In the following description, the policing method and policing circuit of the present invention will be explained in detail in conjunction with an embodiment of the policing circuit 10 having three monitor circuits 11 (11a≠11c) shown in FIG. 3 arranged.

In the policing circuit 10 of FIG. 3, the traffic monitor circuits 11 (11a≠11c) monitor the traffic parameter 22a of the ATM connection to which the cell arrived from the signal line 22 belongs. The traffic monitor circuits 11 (11a≠11c) send the monitor results 12 (12a≠12c) representing the presence or absence of violation in the permissive traffic capacity of the ATM connection to which the cell belongs to the total determination circuit 13.

The total determination circuit 13 sends to a cell passage determination point 61 of the INF 60 a CLP signal 31, a tag signal 32 or a discard signal 33 which are shown as the determination result signal 30 in FIG. 1 to represent whether the cell arrived to the INF 60 is indicated by CLP, tagged or discarded when it is sent to the network. This is executed based on a header information 21a, that is CLP from signal line 21, the monitor results 12 (12a≠12c), and monitor state item 139 read from the traffic parameter table 40 through the signal lines 53 (53a≠53c). The total determination circuit 13 also sends to the selectors 15 (15a≠15c) the presence or absence of update of the traffic parameters (current traffic states) of the traffic monitor circuits 11 (11a≠11c) through output lines 14 (14a≠14c). When the traffic parameter is to be updated, the traffic parameters are written into the traffic parameter table 40 from data lines 52 (52a≠52c) after the monitoring of the traffic in the traffic monitor circuit 11 (11a≠11c). When the traffic parameter is not to be updated, the traffic parameters themselves read from the traffic parameter table 40 through the signal lines 51 (51a51c) are written into the traffic parameter table 40 from the data lines 52 (52a≠52c). Alternatively, the writing is not conducted but it may be processed as if the cell did not arrive the INF 60.

Figure 5:
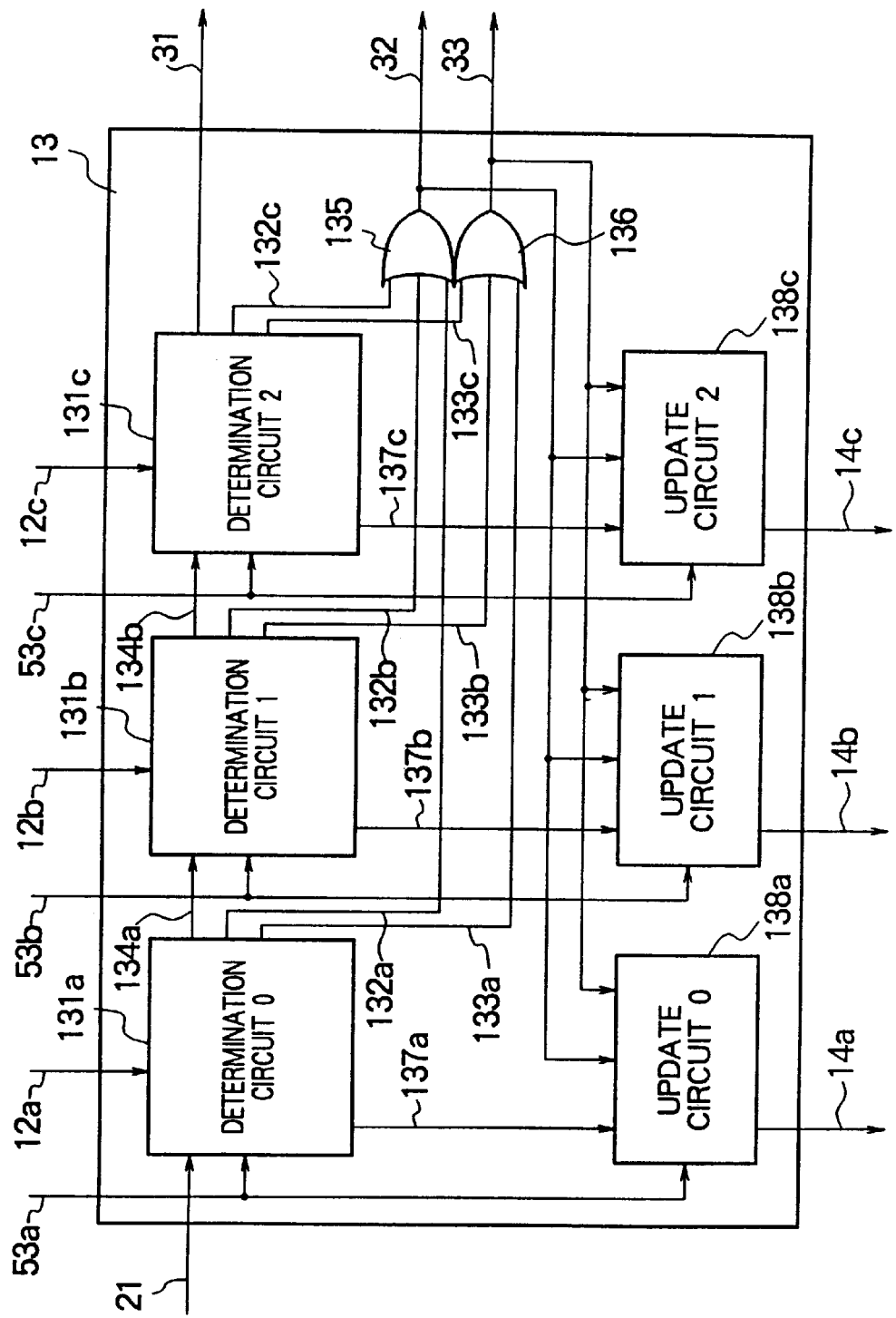
FIG. 5 shows a block diagram of a configuration of a total determination circuit of the policing circuit shown in FIG. 3.

FIG. 5 shows a block diagram of a detailed configuration of the total determination circuit 13 which uses the outputs from the three traffic monitor circuits 11 (11a≠11c) shown in FIG. 3. It is divided into determination circuits 131 (131a≠131c) and update circuits 138 (138a≠138c). Those determination circuits 131 (131a≠131c) and update circuits 138 (138a≠138c) are arranged for the respective traffic monitor circuits 11 (11a≠11c).

Specific configuration and operation are explained. The determination circuit 131a receives the traffic monitor result 12a outputted from the traffic monitor circuit 11a and the CLP 21a included in the header of the arriving cell and supplied from the signal line 21, and determines based on the monitor state item 139 received from the traffic parameter table 40 through the signal lines 53 (53a≠53c) (which is a monitor CLP 139 (X) shown in FIG. 6 which is an identifier to identify whether the determination is to be made when the CLP 21 to be monitored is CLP=0 or when CLP=1, or in both cases, and a discard/tag identifier 139 (Y) which identifies whether the input cell is to be discarded or tagged as the result of determination) and sends an internal update signal 137a, an internal CLP 134a, an internal tag signal 132a and an internal discard signal 133a to the update circuit 138a and the determination circuit 131b.

The determination circuit 131b receives the monitor result 12b of the traffic monitor circuit 11b and the internal CLP 134a sent from the determination circuit 131a and determines based on the monitor CLP 139 (X) of the monitor state item 139 and the discard/tag identifier 139 (Y) as the determination circuit 131 does, and sends an internal CLP 134b, an internal tag signal 132b and an internal discard signal 133b to the update circuit 138b and other determination circuit 131c.

The determination circuit 131c receives the monitor result 12c of the traffic monitor circuit 11c and the internal CLP 134b sent from the determination circuit 131b and determines based on the monitor CLP 139 (X) of the monitor state item 139 and the discard/tag identifier 139 (Y) as other determination circuit 131a and 131b do and sends an internal update signal 137c, an output CLP 31, an internal tag signal 132c and an internal discard signal 133c to the update circuit 138c.

In the above description, the internal update signals 137a, 137b and 137c are condition signals to indicate the updating of the traffic parameter when the determination circuits 131a, 131b and 131c determine that the traffic is normal and there is no change between the input CLP (21a, 134a, 134b) and the output CLP (134a, 134b, 31) of the respective determination circuits 131a, 131b and 131c. The internal tag signals 132a, 132b and 132c are sent to an internal tag signal logical OR circuit 135 which produces a tag signal 32 which in turn is sent to all update circuits 138a, 138b and 138c and the cell passage determination point 61 of the INF 60, and the internal discard signals 133a, 133b and 133c are sent to an internal discard signal logical OR 136 which produces a discard signal 33, which in turn is sent to all update circuits 138a, 138b and 138c and the cell passage determination point 61 of the INF 60.

The update circuits 138a, 138b and 138c receives the internal update signal 137a, 137b and 137c sent from the determination circuits 131a, 131b and 131c, the tag signal 32 sent from the internal tag signal logical OR 135 and the discard signal 33 sent from the internal discard signal logical OR 136 and sends the update signals 14a, 14b and 14c indicating the updating of the traffic parameter (current traffic state) to the traffic parameter table 40 for each of the update circuits 138a, 138b and 138c.

The monitor state item 139 which defines the traffic monitor items and the monitor determination order for the communication service used in the policing circuit of the present invention is now explained.

FIG. 6 shows a portion of the monitor state item 139 and shows a detail of the monitor CLP identifier 139 (X) which is an identifier to change the condition of the traffic determination at the input cell CLP value. The monitor CLP 139 (X) includes three state, 0: 139 (X1) indicating that the determination is to be made when CLP=0, 1: 139 (X2) indicating that the determination is to be made when CLP=1, and 0+1: 139 (X3) indicating that the determination is to be made in both cases. In order to discriminate them, the policing circuit of the present invention uses a 2-bit code (C1: 139 (3), C0: 139 (2), which are normally stored in the traffic parameter table 40 and set to the monitor circuits 11, the determination circuit 131 and the update circuits 138 through the signal lines 51 and 53 in accordance with the communication service.

FIG. 7 also shows a portion of the monitor state item 139 and shows a detail of the discard/tag identifier 139 (Y) which is an identifier to change the condition to discard or tag the input cell. The discard/tag identifier 139 (Y) includes four states, T1: 139 (Y1) and T2: 139 (Y2) indicating the tagging, and D1: 139 (Y3) and D2: 139 (Y4). In order to discriminate them, the policing circuit of the present invention uses the 2-bit code (DT1: 139 (1), DT0: 139 (0)) as the monitor CLP identifier 139 (X) is. The discard/tag identifier 139 (Y) is also normally stored in the traffic parameter table 40 and set to the monitor circuits 11, the determination circuits 131 and the update circuits 138 through the signal lines 51 and 53 in accordance with the communication service.

Figure 11:
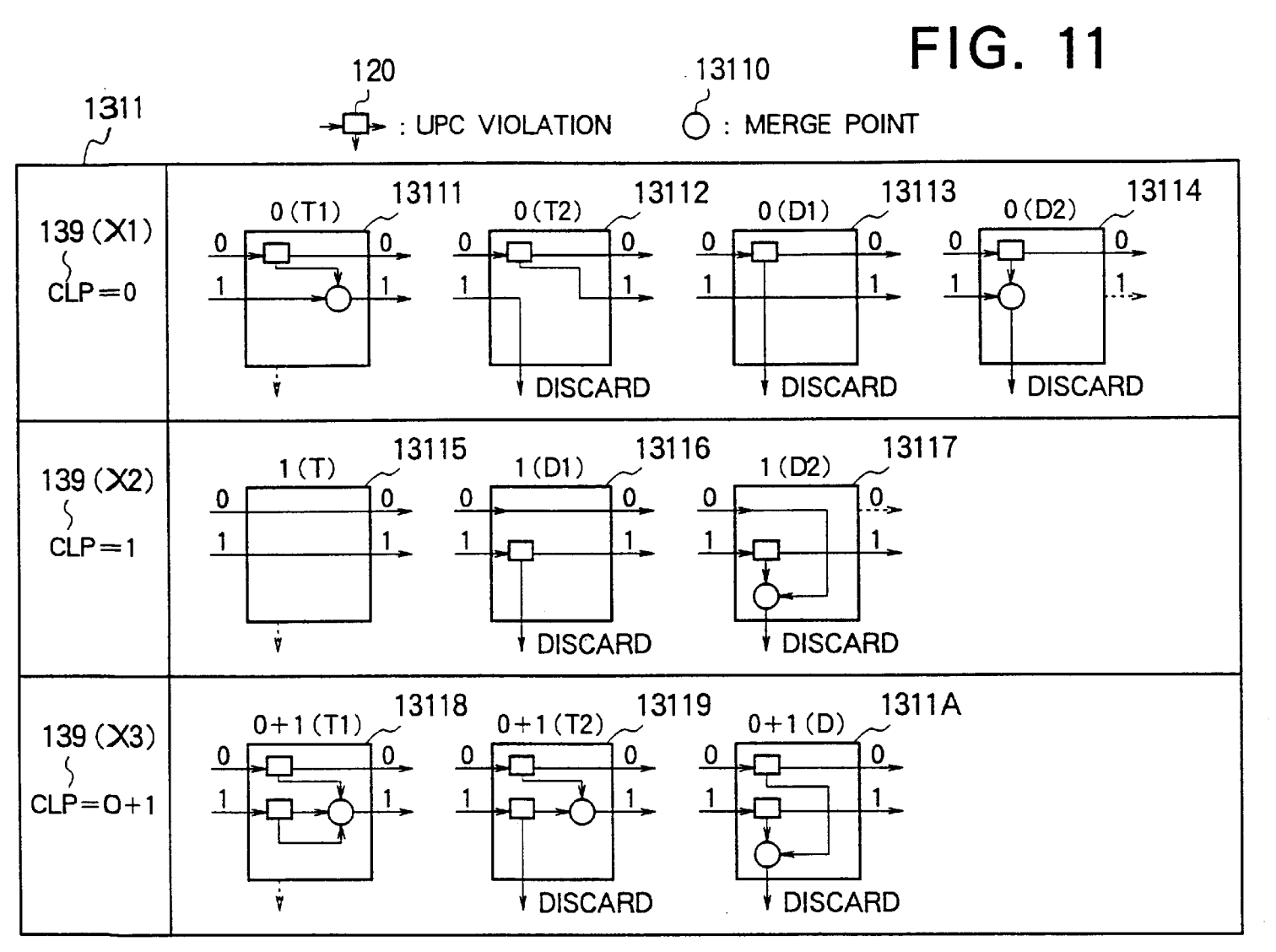

FIG. 11 shows a specific content of the monitor state item 139 and shows the content which the determination circuits 131 determine the monitor results 12 of the monitor circuits 11 for the content of the communication service, that is, the content of the determination pattern which is a combination of the monitor CLP identifier 139 (X) of FIG. 6 and the discard/tag identifier 139 (Y) of FIG. 7. In the policing circuit of the present invention, the combination of the monitor CLP identifier 139 (X) of FIG. 6 and the discard/tag identifier 139 (Y) of FIG. 7 is determined in accordance with the content of the communication service and one of the determination patterns (13111≠1311A) shown in FIG. 11 is set to each determination circuit. In FIG. 11, the numeral at the head of the reference numeral indicates the CLP value to be monitored. Namely, 0 (T1) 13111 to 0 (D2) 13114 are for the determination of the traffic having the input CLP value 0, 1 (T) 13115 to 1 (D2) 13117 are for the determination of the traffic having the input CLP value 1, and 0+1 (T1) 13118 to 0+1 (D) 1311A indicate that the determination of the traffic is to be made independently from the input CLP value. The T in the parentheses indicates the tagging by the determination and D indicates the discard. The content of the determination is now explained.

(1) 0 (T1) 13111: The determination is to be made when the input CLP value is 0. If there is no violation of the traffic, the output CLP is 0. The determination circuit 131 sends the internal update signal 137 (for example, 137a≠137c in FIG. 5) and conveys the updating of the traffic parameter to the update circuit 138. If the monitor result indicates the violation of the traffic, the output CLP is 1 and it is tagged. The determination circuit 131 outputs the internal tag signal 132 (for example, 132a≠132c of FIG. 5) to convey the tagging of the cell. If the input CLP value is 1, the output CLP is 1 without regard to the monitor result 12.

(2) 0 (T2) 13112: The determination is to be made when the input CLP value is 0 and the operation is similar to that of (1). If the input CLP value is 1, the cell is discarded without regard to the monitor result 12 and the determination circuit 131 outputs the internal discard signal 133 (for example, 133a≠133c of FIG. 5) to convey the discard of the cell.

(3) 0 (D1) 13113: The determination is to be made when the input CLP value is 0. If there is no violation of the traffic, the output CLP is 0. The determination circuit 131 sends the internal update signal 137 to convey the updating of the traffic parameter to the update circuit 138. If the monitor result indicates the violation, the output CLP is 1 and the cell is discarded. The determination circuit 131 outputs the internal discard signal 133 to convey the discard of the cell. If the input CLP value is 1, the output CLP is 1 without regard to the monitor result 12.

(4) 0 (D2) 13114: The determination is to be made when the input CLP value is 0 and the operation is similar to that of (3). If the input CLP value is 1, the cell is discard without regard to the monitor result 12 and the determination circuit 131 outputs the internal discard signal 133 to convey the discard of the cell.

(5) 1 (T) 13115: This is a dummy determination circuit which outputs the input CLP value as the output CLP value without regard to the input CLP value or the content of the monitor result 12, that is, makes no determination. It is used in the policing circuit of the present invention to adjust the number of determination circuits provided in accordance with the service content in providing various communication services.

(6) 1 (D1) 13116: The determination is made when the input CLP value is 1. If the input CLP value is 0, the output CLP is 0 without regard to the monitor result 12. If the input CLP value is 1 and there is no violation in the traffic, the output CLP is 1 and the determination circuit 131 sends the internal update signal 137 to convey the updating of the traffic parameter to the update circuit 138. However, if the monitor result indicates the violation, the cell is discarded. The determination circuit 131 then outputs the internal discard signal 133 to convey the discard of the cell.

(7) 1 (D2) 13117: The determination is made when the input CLP value is 1. When the input CLP value is 0, the output CLP is 1 without regard to the monitor result 12 and the cell is discarded. The determination circuit 131 then outputs the internal discard signal 133 to convey the discard of the cell. The operation when the input CLP value is 1 is identical to that of (6).

(8) 0+1 (T1) 13118: The determination is made without regard to the input CLP value. If there is no violation of the traffic, the input CLP value is outputted as the output CLP. If the monitor result indicates the violation and the input CLP value is 0, the output CLP is 1 and it is tagged. The determination circuit 131 then outputs the internal tagging signal 132 to convey the tagging of the cell. If the input CLP value is 1, the output CLP is 1 and the determination circuit 131 sends the internal update signal 137 to convey the updating of the traffic parameter to the update circuit 138.

(9) 0+1 (T2) 13119: When the input CLP value is 0 and if there is no violation of the traffic, the output CLP is 0. If the monitor result indicates the violation, the output CLP is 1 and it is tagged. The determination circuit 131 then outputs the internal tag signal 132 to convey the tagging of the cell. The determination circuit 131 sends the internal update signal without regard to the monitor result 12 to convey the updating of the traffic parameter to the update circuit 138. On the other hand, when the input CLP value is 1 and if the is no violation in the traffic, the output CLP is 1. The determination circuit 131 then sends the internal update signal 137 to convey the updating of the traffic parameter to the update circuit 138. If the monitor result indicates the violation, the output CLP is 1 and the cell is discarded. The determination circuit 131 then outputs the internal discard signal 133 to convey the discard of the cell.

(10) 0+1 (D) 1311A: When the input CLP value is 0 and if there is no violation in the traffic, the output CLP is 0. The determination circuit 131 then sends the internal update signal 137 to convey the updating of the traffic parameter to the update circuit 138. However, when the monitor result indicates the violation, the cell is discarded. The determination circuit 131 then outputs the internal discard signal 132 to convey the discard of the cell. On the other hand, when the input CLP value is 1, the operation is identical to that of (9).

FIG. 8 shows a truth table of the decision logic for realizing the determination circuit and illustrates the logical operation of the decision pattern 1311 shown in FIG. 11 and described above. The determination circuit 131 of the policing circuit of the present invention receives the input CLP (21a, 134), the monitor result 12 (UPC violation in FIG. 8), the monitor CLP identifier 139 (X) of FIG. 6 corresponding to the communication service and the discard/tag signal 139 (Y) of FIG. 7 as the input signals, and outputs the output CLP (31, 134), the internal tag signal 132, the internal discard signal 133 and the internal update signal 137 as the output signals, and makes the logical decision as shown in the truth table of FIG. 8. More specifically, when various communication services are provided in the policing circuit of the present invention, the determination circuit for the content of the service is selected by the truth table (the monitor CLP state 1391 of FIG. 6 and the discard/tag state 1392 of FIG. 7 are designated) and the determination is made based on the input CLP (21, 134) and the monitor result 12 (UPC violation) as the input signals. In the present embodiment, the determination circuit 131 is realized by a memory which uses the state of the monitor CLP of FIG. 6, the discard/tag state of FIG. 7, the input CLP (21, 134) and the monitor result 12 (UPC violation) are used as the addresses and the output of the truth table of FIG. 8 as the data, and a portion of the addresses (the state of the monitor CLP of FIG. 6 and the discard/tag state of FIG. 7) is set through the signal lines 51 and 53 in accordance with the communication service to set one of the above determination patterns to each determination circuit. The truth table may be provided in the traffic parameter table 40 and a necessary portion of the content of the truth table may be set in the memory of the monitor circuit 11, the determination circuit 131 and the update circuit 138 through the signal lines 51 and 53 in accordance with the communication service. By this configuration, the policing circuit which may comply with the communication service by merely updating the memory content or adding data without addition of the hardware even if new communication service is added and a new determination pattern is required can be readily attained. The present memory may by arranged in a common place in the apparatus and only a portion of the truth table necessary for the determination for the corresponding communication service may be set in the determination circuit. The logical operation for the determination of FIG. 8 may be attained by hardware using gate circuits and F/F's or a microcomputer and firmware.

FIGS. 9 and 10 show truth table of logic which realizes the update circuit 138 indicating the updating of the traffic parameter (traffic state) in accordance with the decision result of the determination circuit 131, and show the logic to indicate whether to update the traffic monitor parameter of the traffic parameter table 40 as the result of the determination by the determination circuit shown in FIG. 11. When various communication services are to be provided in the policing circuit of the present invention, the update circuit 138 corresponding to the content of the service is selected by the truth table (the state of the monitor CLP 1391 of FIG. 6 and the discard/tag state 1392 of FIG. 7 are designated), the internal update signal 137 which is the output of the determination circuit 131, the tag signal 32 and the discard signal 33 are used as the input signals and the update signal 14 is outputted. In the update circuit of FIG. 5, when the monitor CLP 139 (X) is 0: 139 (X1) and no tag signal 33 or discard signal 34 is sent from the logical OR 135 of the internal tag signals 132 (132a≠132c) and the logical OR 136 of the internal discard signals 133 (133a≠133c), that is when there is no UPC violation, the update circuits 138 (138a≠138c) send the update signals 14 (14a≠14c) for updating the traffic monitor parameter to the selectors 15 (15a≠15c). When the monitor CLP 139 (X) is 1: 139 (X2) or 0+1: 139 (X3) and the discard signal 34 is not sent from the logical OR 136 of the internal discard signal, the update circuit 138 sends the update signal 14 for updating the traffic monitor parameter. In the present embodiment, as the determination circuit described above does, the update circuit 138 is realized by a memory which receives the state of the monitor CLP of FIG. 6, the discard/tag state of FIG. 7 and the output of the determination circuit shown in the truth table of FIG. 8 as the address and outputs the data for indicating the updating. The present memory may be provided in a common place and only a portion of the truth table necessary for the communication service may be set in the determination circuit. It may also be realized by hardware using gate circuits and F/F's or a microcomputer and firmware so long as it attains the logical operation of determination shown in FIGS. 9 and 10. The decision logic of the above determination circuit may also be included in the memory.

In the total determination circuit 13 having the determination circuit 131 and the update circuit 138 connected, the total determination circuit 13 can associate a plurality of monitor items even when three UPC's are operated in parallel in the traffic monitor circuit 11 so that it may process as if a plurality of monitoring are conducted sequentially. Namely, the policing circuit which conducts the policing for the communication service having a plurality of dependent traffic parameters can be readily attained.

FIG. 28 shows a block diagram of a configuration of the ATM communication apparatus in which the policing circuit described above is integrally formed by an LSI or an IC.

In the present embodiment, the LSI which integrally forms the policing circuit 10 receives the parameter 20 (the header information 21$a$ from the input line 21 and the traffic parameter address 22$a$ from the signal line 22 of FIG. 1) which is the information relating to the traffic extracted from the cell inputted to the INF 60 of the ATM communication apparatus, and monitors the traffic of the cell inputted to the INF 60 in accordance with the monitor and determination rules defined by the communication service by the instructions from the communication unit MPU 50 for controlling the ATM communication apparatus through the address line and the data line to determine whether to discard the input cell, tag it or permit the input into the ATM communication apparatus, and outputs the determination result 30. The INF 60 conducts the policing of the input cell in accordance with the determination result. In the present embodiment, the traffic parameter table 40 which holds the traffic parameters comprises a random access memory (RAM) externally of the LSI as shown in FIG. 1 and inputs and outputs the data necessary for the operation described above through the data line and the address line in accordance with the instruction of the control unit MPU 50 or the state of the policing circuit 10, that is, in the process of policing. Where the LSI can accommodate the RAM, the traffic parameter table 40 may be accommodated in the LSI of the policing circuit as shown in FIG. 2.

As described above, the total determination circuit 13 of the policing circuit selects the rule (logical operation) corresponding to the communication service from the logic for performing the determination update operations shown in the truth tables of FIGS. 8≠10, that is, when the communication service is designated by the command of the MPU 50, a portion of the truth tables is designated to conduct the necessary operation. Accordingly, in the LSI of the present embodiment, when the interface of the LSI and the MPU and the RAM (including a built-in RAM) is constructed to input and output through the address line and the data line, the total determination circuit 13 may be constructed by a memory which accommodates the truth table and selects the address by the command from the MPU 50 or the truth table may be accommodated in the traffic parameter table and only the necessary portion thereof is transferred to the total determination circuit 13 by the command from the MPU 50, or the MPU 50 may store the truth table and transfer only the necessary portion thereof to the total determination circuit 13 when the communication service is designated.

An embodiment which applies the policing method and policing circuit of the present invention to various communication services shown by the ATM forum is now explained.

Specifically, examples of the switched multi-megabit data service, the frame relay service, the constant bit rate service and the LAN interconnection in the examples of rules specified in the traffic contract of the Traffic Management Baseline Text are realized in the policing circuit 10 comprising three traffic monitor circuits 11, three determination circuits 131 and three update circuits 138 shown in FIGS. 3 and 5.

Figure 12:
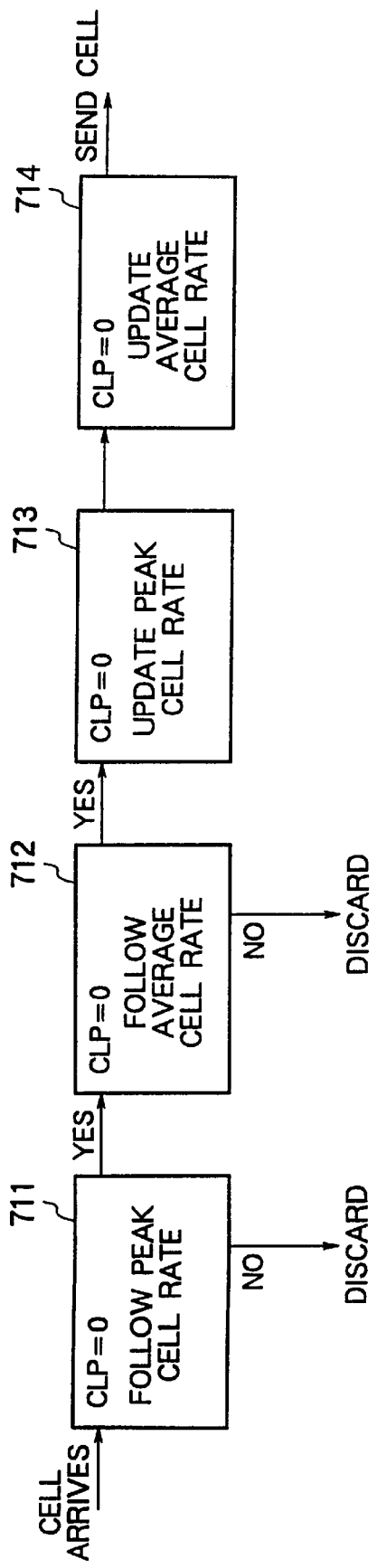
FIG. 12 shows monitor state items of a switched multi-megabit data service (SMDR)
Figure 13:
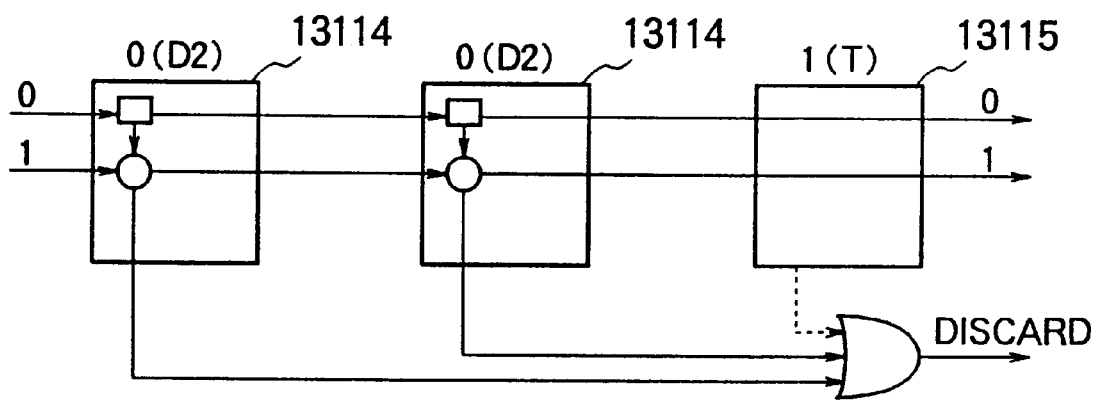
FIG. 13 shows connection of the determination circuit when the policing circuit of the present invention conducts the switched multi-megabit service.

An example in which the policing circuit of the present invention is applied to the switched multi-megabit data service is first explained. FIG. 12 shows a monitor item of the traffic monitored in the switched multi-megabit data service (SMDS) and a pattern of the monitor state item 139. In order to conduct the policing of the SMDS, the monitor state item 139 of the SMDS is selected from the determination types 1311 which are set in the traffic parameter table 40 and it is set in the determination circuit 131. Specifically, three determination types are selected as shown in FIG. 13 to form the total determination circuit 13. Namely, in the SMDS, the traffic parameter for the peak cell rate of CLP=0 is set in the traffic parameter table 40 of the traffic monitor circuit 11$a$ to monitor the traffic parameter. For the monitor circuit 11$b$, the traffic parameter for the average cell of CLP=0 is set in the traffic parameter table 40 to monitor the traffic parameter. In the present service, the monitor items may be only two, for the peak cell rate and the average rate of CLP=0. Namely, the monitor circuit 11$c$ is not used and any traffic parameter may be set in the traffic parameter table 40. Alternatively, no setting may be made. The traffic monitor circuits 11$a$, 11$b$ and 11$c$ are not dependent to each other and when the cell arrive at the INF 60 and the policing circuit 10 detects the arrival of the cell, the three traffic monitor circuits 11$a$, 11$b$ and 11$c$ operate in parallel and any violation in the traffic parameters is monitored.

The determination circuits 131$a$, 131$b$ and 131$c$ are connected to the traffic monitor circuits 11$a$, 11$b$ and 11$c$, respectively. One of the determination types 1311 shown in FIG. 11 is set in each of the determination circuits 131$a$, 131$b$ and 131$c$ by the monitor state item 139 of the SMDS set in the traffic parameter. By the combination of the determination circuits 131$a$, 131$b$ and 131$c$, the dependency of the policing is determined and the policing of the SMDS service is realized. Specifically, for the determination circuit 131$a$ connected to the traffic monitor circuit 11$a$, the pattern 0 (D2) 13114 which sends the internal discard signal 133 when there is violation in the traffic monitor circuit 11$a$ (peak cell rate violation) and sends the internal discard signal 133 for the input cell of CLP=1 is used. The determination circuit 131$a$ receives the CLP 21$a$ of the cell arrived at the INF 60 as the input CLP 21 and determines based on the decision logic shown in FIG. 8 to output the CLP 134$a$. The CLP 134$a$ sent from the determination circuit 131$a$ is used as the input CLP 134$a$ of the determination circuit 131$b$. For the determination circuit 131$b$ connected to the traffic monitor circuit 11$b$, the pattern 0 (D2) 13114 which sends the internal discard signal 133 when there is violation in the traffic monitor circuit 11$b$ (average rate violation) for the input cell of CLP=0 and sends the internal discard signal 133 for the input cell of CLP=1 is used. The determination circuit 131$b$ receives the output CLP 134$a$ of the determination circuit 131$a$ as the input CLP and conducts the determination based on the decision logic shown in FIG. 8 to output the output CLP 134$b$. The CLP 134$b$ sent from the determination circuit 131$b$ is used as the input CLP 134$b$ of the determination circuit 131$c$. The present service may be attained by two determination circuits as well as two monitor circuits, and for the determination circuit 131c connected to the traffic monitor circuit 11c, the dummy pattern 1 (T) 13115 which sends the cell with input CLP=0 as it is without regard to the result of the traffic monitor circuit 11c for the cell of the input CLP=0, and also sends the cell with the input CLP=1 as it is without regard to the result of the traffic monitor circuit 11c for the cell of the input CLP=1 is used. The determination circuit 131c receives the output CLP 134b of the determination circuit 131b as the input CLP and conducts the logic operation shown in FIG. 8 to output the output CLP 134c. The CLP sent from the determination circuit 131c and the CLP's sent from other determination circuits are logically ORed to produce the output of the policing circuit 10.

Connected to the determination circuit 131a is the update circuit 138a for the pattern 0 (D2) 13114 which sends the internal discard signal 133a when there is violation in the traffic monitor circuit 11a for the cell of the input CLP=0 and sends the internal discard signal 133a for the cell od the input CLP=1, one for each determination pattern. The update circuit 138a operates in the logic shown in FIGS. 9 and 10 and when the determination circuit 131a sends the internal update signal 137a and no tagging or discard is conducted in other policing, it sends the update signal 14a for updating the traffic parameter for the traffic monitor circuit 11a. Connected to the determination circuit 131b is the update circuit 138b for the determination pattern 0 (D2) 13114 which sends the internal discard signal 133b when there is violation in the traffic monitor circuit 11b for the cell of the input CLP=0 and sends the internal discard signal 133b for the cell of the input CLP=1. The update circuit 138b also operates in the logic shown in FIGS. 9 and 10, and when the determination circuit 131b sends the internal update signal 137b and no tagging or discard is conducted in other policing, it sends the update signal 14b for updating the traffic parameter for the traffic monitor circuit 11b. Connected to the determination circuit 131c is the update circuit 138c for the dummy pattern 1 (T) 13115 of the determination circuit. The determination circuit 138c also operates in the logic shown in FIGS. 9 and 10 and when the determination circuit 138c sends the internal update signal 137c and no discard is conducted in other policing, it sends the update signal 14c for updating the traffic parameter for the traffic monitor circuit 11c.

In accordance with the policing circuit of the present invention, the policing of the SMDS service can be realized by merely setting the content of the previously provided truth table to the respective circuits (setting in the memory) without changing the connection of the circuit.

Figure 14:
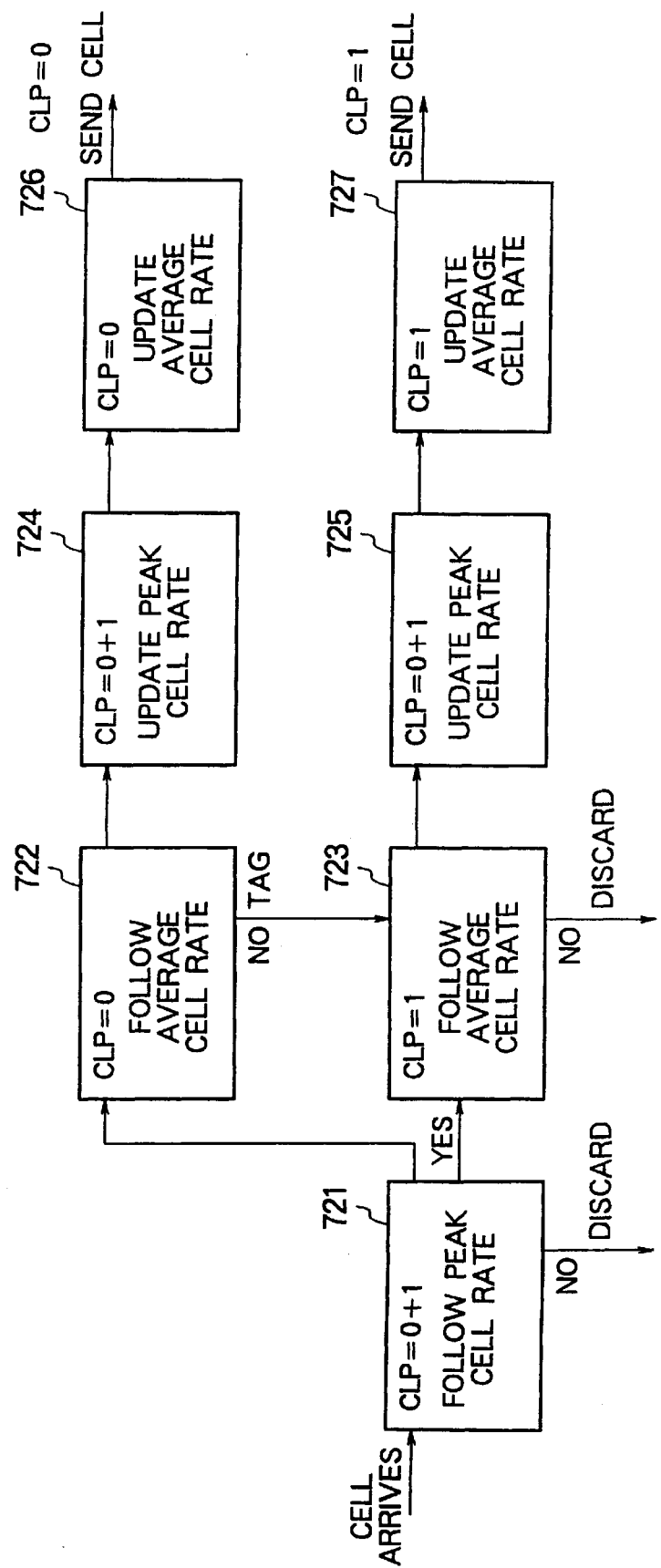
FIG. 14 shows monitor state items of a frame relay service.
Figure 15:
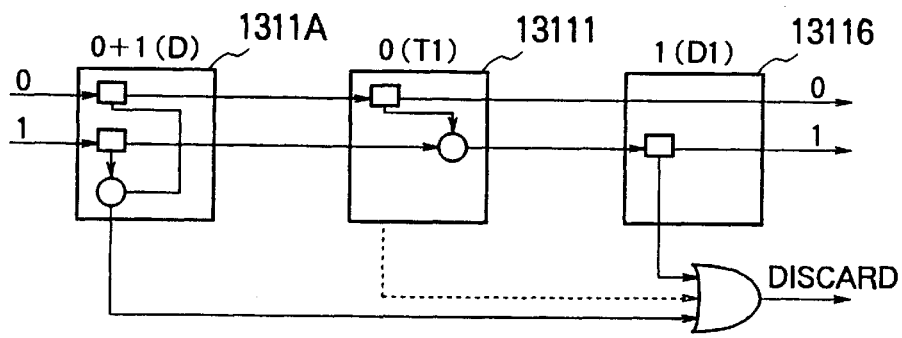
FIG. 15 shows a connection of the determination circuit when the policing circuit of the present invention conducts the frame relay service.

An example in which the policing circuit of the present invention is applied to the policing of the frame relay service is now explained. FIG. 14 shows a pattern of the monitor item to be monitored in the frame relay service (FRS) and the monitor state item 139. In order to conduct the policing of the FRS, the monitor state item 139 of the FRS is selected from the determination types 1311 which is set in the traffic parameter table 40 and it is set in the determination circuit 131. Specifically, the determination type 1311 is selected as shown in FIG. 15 to form the total determination circuit 13. In the FRS, the traffic parameter for the peak cell rate of all cells is set in the traffic parameter table 40 without regard to the CLP value and the traffic parameter is monitored by the traffic monitor circuit 11a. The traffic parameter for the average rate of CLP=1 is set in the traffic parameter table 40 and the traffic parameter is monitored by the traffic monitor circuit 11c. The respective traffic monitor circuits 11a, 11b and 11c are not dependent to each other as they are in the SMDS and when the policing circuit 10 detects the arrival of the cell to the INF 60, the three traffic monitor circuits 11a, 11b and 11c operate in parallel and any violation in the respective traffic parameters is monitored.

The determination circuits 131a, 131b and 131c are connected to the respective traffic monitor circuits 11a, 11b and 11c and one of the determination types 1311 shown in FIG. 11 is selected and set by the monitor state item 139 of the FRS which is set in the traffic parameter. By the combination of the determination circuits 131a, 131b and 131c, the policing of the FRS service is attained. Specifically, for the determination circuit 131a connected to the traffic monitor circuit 11a, the pattern 0+1 (D) 1311A which sends the internal discard signal 133 when there is violation in the traffic monitor circuit 11a (peak cell rate violation) for all input cells without regard to the CLP value is used. The determination circuit 131a receives the CLP 21a of the cell arrived at the INF 60 as the input CLP and conducts the determination in the decision logic shown in FIG. 8 to output the output CLP 134a. The CLP 134a sent from the determination circuit 131a is used as the input CLP 134a of the determination circuit 131b. For the determination circuit 131b connected to the traffic monitor circuit 11b, the pattern 0 (T1) 13111 which sends the internal tag signal when there is violation in the traffic monitor circuit 11b (average rate violation) for the cell of the input CLP=0 and sends the input CLP=1 as it is for the cell of the input CLP=1 is used. The determination circuit 131b receives the output CLP 134a of the determination circuit 131a as the input CLP and determines in the decision logic shown in FIG. 8 to output the output CLP 134b. The CLP 134b sent from the determination circuit 131b is used as the input CLP 134b of the determination circuit 131c. For the determination circuit 131c connected to the traffic monitor circuit 11c, the pattern 1 (D1) 13116 which sends the input CLP=0 as it is for the cell of the input CLP=0 and sends the internal discard signal 133 when there is violation in the traffic monitor circuit 11c (average rate violation) for the cell of the input CLP=1 is used. The determination circuit 131c receives the output CLP 134b from the determination circuit 131b as the input CLP and determines in the decision logic shown in FIG. 8 to output the output CLP 31. The CLP sent from the determination circuit 131c and the CLP's sent from other determination circuits are logically ORed to produce the output CLP 31 of the policing circuit 10.

Connected to the determination circuit 131a is the update circuit 138a for the pattern 0+1 (D) 1311A which sends the internal discard signal 133a when there is violation in the traffic monitor circuit 11a for all input cells without regard to the CLP value, one for each determination pattern. The update circuit 138a operates in the logic shown in FIGS. 9 and 10 and when the internal update signal 137a is sent from the determination circuit 131a and the cell is not discarded in other policing, it sends the update signal 14a for updating the traffic parameter for the traffic monitor circuit 11a. Connected to the determination circuit 131b is the update circuit 138b for the pattern 0 (T1) 13111 which sends the internal tag signal when there is violation in the traffic monitor circuit 11b for the cell of the CLP=0 and sends the input CLP=1 as it is for the cell od CLP=1. The update circuit 138b operates in the logic shown in FIGS. 9 and 10 and when the internal update signal 137b is sent from the determination circuit 131b and no tagging or discard is conducted in other policing, it sends the update signal 14b for updating the traffic parameter for the traffic monitor circuit 11b. Connected to the determination circuit 131c is the update circuit 138c for the pattern 0 (D1) 13116 which sends the input CLP=0 as it is for the cell of the input CLP=0 and sends the internal discard signal 133c when there is violation in the traffic monitor circuit 11c for the cell of the input CLP=1. The update circuit 138c operates in the logic shown in FIGS. 9 and 10 and when the internal update signal 137c is sent from the determination circuit 138c and no tagging or discard is conducted in other policing, it sends the update signal for updating the traffic parameter for the traffic monitor circuit 11c.

As described above, in accordance with the policing circuit of the present invention, the policing of the FRS service is attained by merely setting the content of the truth tables shown in FIGS. 8 to 10 as it is for the SMDS, and the policing circuit which does not require the reconnection of the circuits is realized. Namely, even if the communication service provided by the ATM communication apparatus is changed from the SMDS described above to the FRS service of the present embodiment, the change of the hardware such as the reconnection of the circuits is not necessary and the policing of various communication services is attained by merely commanding or controlling the setting of the circuits by selecting the content necessary to provide the service from the content of the truth tables.

Figure 16:
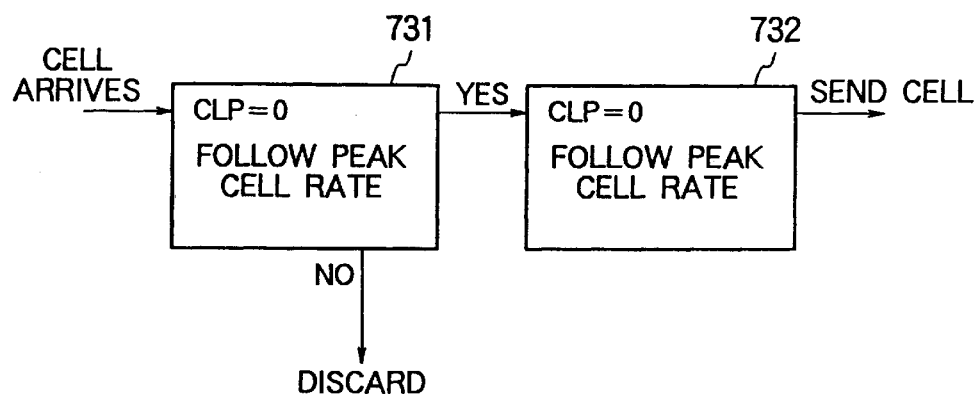
FIG. 16 shows monitor state items of a constant bit rate service.
Figure 17:
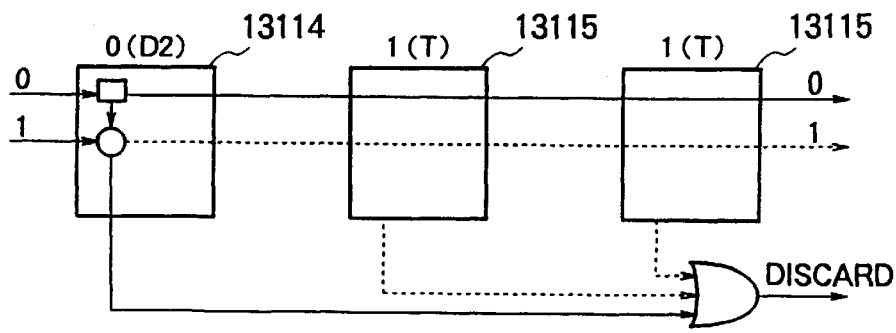
FIG. 17 shows a connection of the determination circuit when the policing circuit of the present invention conducts the constant bit rate service.

An example in which the policing circuit of the present invention is applied to the policing of the constant bit rate service is now explained. FIG. 16 shows a pattern of the monitor item in the constant bit rate service (CBR) and the monitor state item 139. In order to conduct the policing of the CBR, the monitor state item 139 of the CBR is selected from the determination types 1311 which are set in the traffic parameter table 40 and it is set in the determination circuit 131. Specifically, the determination circuit 1311 as shown in FIG. 17 is selected to form the total determination circuit 13. In the CBR, the traffic parameter for the peak cell rate of CLP=0 is set to the traffic parameter table 40 and the traffic parameter is monitored by the traffic monitor circuit 11a. In the present service, the monitor item may be only one, the peak cell rate of CLP=0, that is, the traffic monitor circuits 11b and 11c are not used. Therefore, any traffic parameter may be set in the traffic parameter table 40 as it is in the traffic monitor circuit 11c for the SMDS described above. The respective traffic circuits 11 are not dependent to each other and when the cell arrives at the INF 60 and the policing circuit 10 detects it, the three traffic circuits 11 operates in parallel to monitor any violation in the respective traffic parameters as that do in the two previous communication services.

The traffic monitor circuits 11a, 11b and 11c are connected to the determination circuits 131a, 131b and 131c, respectively. One of the determination types 1311 shown in FIG. 11 is selected and set to each of the determination circuits 131a, 131b and 131c by the monitor state item 139 of the CBR which is set in the traffic parameter, and the policing of the CBR service is attained by the combination of the determination circuits 131a, 131b and 131c. Specifically, for the determination circuit 131a connected to the traffic monitor circuit 11a, the pattern 0 (D2) 13114 which sends the internal discard signal 133 when there is violation in the traffic monitor circuit 11a (peak cell rate violation) for the cell of the input CLP=0 and sends the internal discard signal 133 for the cell of the input CLP=1 is used. The determination circuit 131a receives the CLP 21a of the arriving cell as the input CLP and determines in the decision logic shown in FIG. 8 to output the output CLP 134a. The CLP 134a sent from the determination circuit 131a is used as the input CLP 134a of the determination circuit 131b. As described above in connection with the monitor circuit, the present service may be attained by one determination circuit. Thus, for the determination circuit 131b connected to the traffic monitor circuit 11b and the determination circuit 131c connected to the traffic monitor circuit 11c, the dummy pattern 1 (T) 13115 which sends the input CLP=0 as it is for the cell of the input CLP=0 without regard to the result of the traffic monitor circuit and sends the input CLP=1 as it is for the cell of the input CLP=1 without regard to the result of the traffic monitor circuit 11 is used. Those determination circuits operate in the logic shown in FIG. 8 to output the output CLP 134. The CLP's sent from the respective determination circuits 131a, 131b and 131c are logically ORed to produce the output CLP 31 of the policing circuit 10.

Connected to the determination circuit 131a is the update circuit 138a for the pattern 0 (D2) 13114 which sends the internal discard signal 133a when there is violation in the traffic monitor circuit 11a for the cell of the input CLP=0 is connected, for each determination pattern. The update circuit 138a operate in the logic shown in FIGS. 9 and 10 and when the internal update signal 137a is sent from the determination circuit 131a and no tagging or discard is conducted in other policing, it sends the update signal 14a for updating the traffic parameter for the traffic monitor circuit 11a. Connected to the determination circuits 131b and 131c are the update circuits 138b and 138c, respectively corresponding to the dummy pattern 1 (T) 13115. The update circuits 138b and 138c operate in the logic shown in FIGS. 9 and 10 and when the internal update signal 137 is sent from the determination circuit 131 and no tagging or discard is conducted in other policing, they send the update signals 14b and 14c for updating the traffic parameters for the traffic monitor circuits 11b and 11c, respectively.

In accordance with the policing circuit of the present invention, the policing of the CBR service is attained by merely setting the content of the truth tables shown in FIGS. 8 to 10 to each circuit as it is in the communication services described above, and the policing circuit which does not require the reconnection of the circuits is realized. Namely, even if the communication service provided by the ATM communication apparatus is changed from the communication service described above to the CBR service of the present embodiment, the change of the hardware such as the reconnection of the circuits is not necessary so long as a sufficient number of circuits to provide the communication services are provided, and the content appropriate to provide the service (dummy determination circuit in the present embodiment) may be selected from the truth tables and the circuits not necessary to provide the service may be rearranged. In this manner, the policing of various communication services may be attained by simple command or control.

Figure 18:
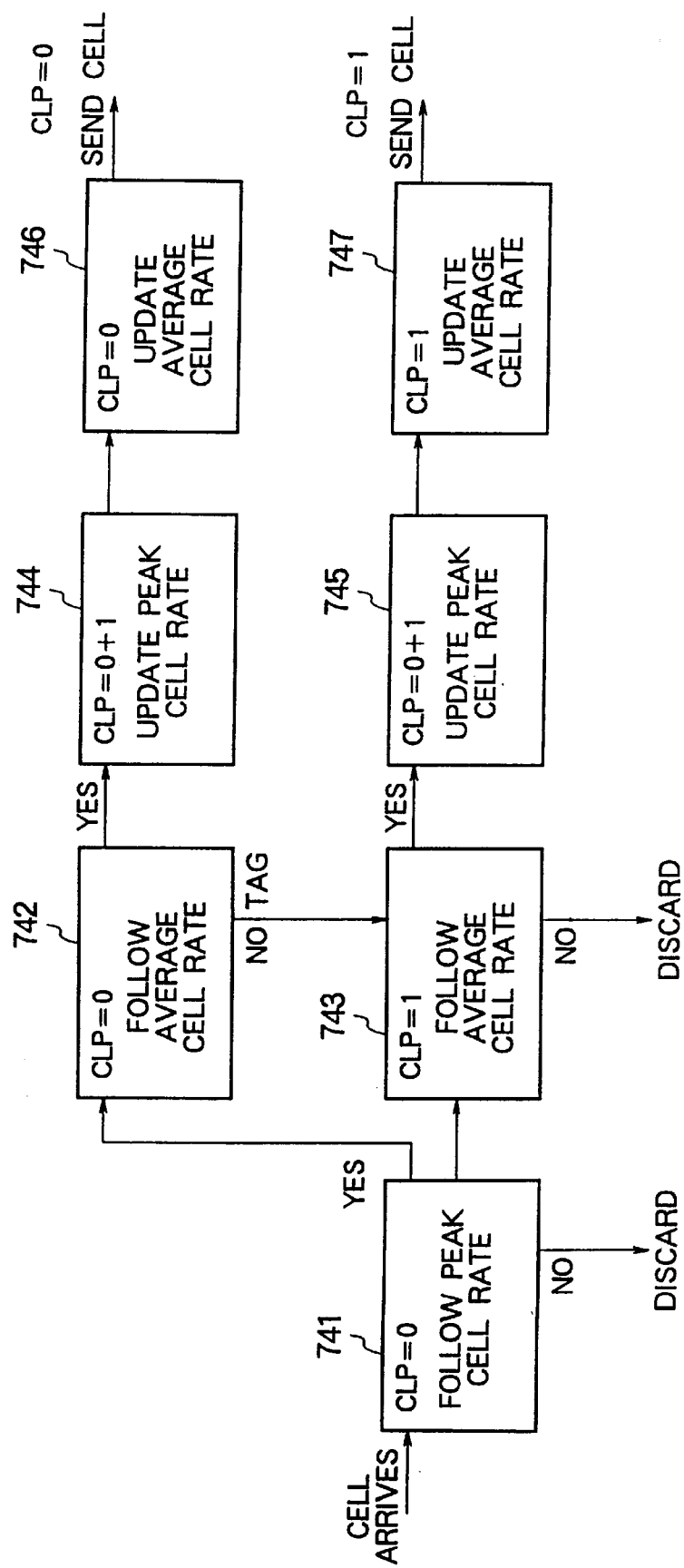
FIG. 18 shows monitor state items of a LAN interconnection.
Figure 19:
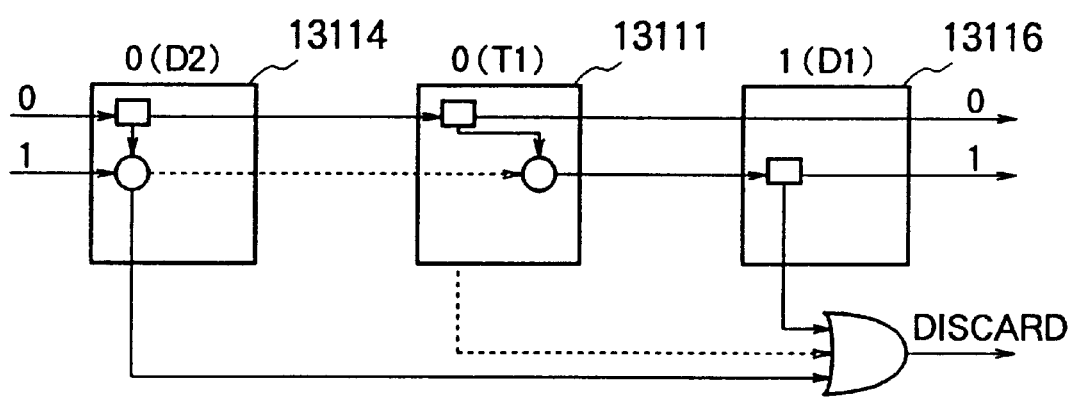
FIG. 19 shows a connection of the determination circuit when the policing circuit of the present invention conducts the LAN interconnection.

An example in which the policing circuit of the present invention is applied to the LAN interconnection service is now explained. FIG. 18 shows a pattern of the monitor item in the LAN interconnection service and the monitor state item 139. In order to conduct the policing, the monitor state item 139 of the LAN interconnection service is selected from the determination types 1311 which are set in the traffic parameter table 40 and it is set in the determination circuit 131. Specifically, the determination type 1311 is selected as shown in FIG. 19 to form the total determination circuit 13. In the LAN interconnection service, the traffic parameter for the peak cell rate of CLP=0 is set in the traffic parameter table 40 and the traffic parameter is monitored by the traffic monitor circuit 11a. The traffic parameter for the average rate of CLP=0 is set to the traffic parameter table 40 and the traffic parameter is monitored by the traffic monitor circuit 11b. The traffic parameter for the average rate of CLP=1 is set in the traffic parameter table 40 and the traffic parameter is monitored by the traffic monitor circuit 11c. The respective traffic monitor circuits 11a, 11b and 11c are not dependant to each other as they are in the previous embodiments and when the cell arrives at the INF 60 and the policing circuit 10 detects the arrival of the cell, the three traffic monitor circuits 11a, 11b and 11c operate in parallel to monitor any violation in the traffic parameters.

Connected to the respective traffic monitor circuits 11a, 11b and 11c are determination circuits 131a, 131b and 131c. For the determination circuits 11a, 11b and 11c, one of the determination types 1311 shown in FIG. 13 is selected and set by the monitor state item 139 of the LAN interconnection service which is set in the traffic parameter. The policing of the LAN interconnection is attained by the combination of the determination circuits 131a, 131b and 131c. Specifically, for the determination circuit 131a connected to the traffic monitor circuit 11a, the pattern 0 (D2) 13114 which sends the internal discard signal 133 when there is violation in the traffic monitor circuit 11a (peak cell rate violation) for the cell of the input CLP=0 and sends the internal discard signal 133 for the cell of the input CLP=1 is used. The determination circuit 131a receives the CLP 21a of the arriving cell as the input CLP and conducts the determination in the decision logic shown in FIG. 8 to output the output CLP 134a. The CLP 134a sent from the determination circuit 131a is used as the input CLP 134a of the determination circuit 131b. For the determination circuit 131b connected to the traffic monitor circuit 11b, the pattern 0 (T1) 13111 which sends the internal tag signal 132 when there is violation in the traffic monitor circuit 11b (average rate violation) for the cell of the input CLP=0 and sends the input CLP=1 as it is for the cell of the input CLP=1 is used. The determination circuit 131b receives the output CLP 134a of the determination circuit 131a as the input CLP and conducts the determination in the decision logic shown in FIG. 8 to output the output CLP 134b. The CLP 134b sent from the determination circuit 131b is used as the input CLP 134b of the determination circuit 131c. For the determination circuit 131c connected to the traffic monitor circuit 11c, the pattern 1 (D1) 13116 which sends the input CLP=0 as it is for the cell of the input CLP=0 and sends the internal discard signal 133 when there is violation in the traffic monitor circuit 11c (average rate violation) is used. The determination circuit 131c receives the output CLP 134b of the determination circuit 131b as the input CLP and conducts the determination in the decision logic shown in FIG. 8 to output the output CLP 134c. The CLP sent from the determination circuit 131c and the CLP's sent from other determination circuits are logically ORed to produce the output CLP 31 of the policing circuit 10.

Connected to the determination circuit 131a is the update circuit 138a for the determination pattern 0 (D2) 13114 for sending the internal discard signal 133a when there is violation in the traffic monitor circuit 11a for the cell of the input CLP=0 and sending the internal discard signal 133a for the cell of the input CLP=1. The update circuit 138a operates in the logic shown in FIGS. 9 and 10 and when the internal update signal 137a is sent from the determination circuit 131a and no tagging or discard is conducted in other policing, it sends the update signal 14a for updating the traffic parameter for the traffic monitor circuit 11a. Connected to the determination circuit 131b is the update circuit 138b for the determination pattern 0 (T1) 1311 which sends the internal tag signal 132b when there is violation in the traffic monitor circuit 11b for the cell of the input CLP=0 and sends the input CLP=1 as it is for the cell of the input CLP=1. The update circuit 138b operates in the logic shown in FIGS. 9 and 10 and when the internal update signal 137b is sent from the determination circuit 131b and no tagging or discard is conducted in other policing, it sends the update signal 14b for updating the traffic parameter for the traffic monitor circuit 11b. Connected to the determination circuit 131c is the update circuit 138c for the determination pattern 0 (D1) 13116 for sending the input CLP=0 as it is for the cell of the input CLP=0 and sending the internal discard signal 133c when there is violation in the traffic monitor circuit 11c for the cell of the input CLP=1. The update circuit 138c operates in the logic shown in FIGS. 9 and 10 and when the internal update signal 137c is sent from the determination circuit 138c and no discard is conducted in other policing, it sends the update signal 14c for updating the traffic parameter for the traffic monitor circuit 11c.

In accordance with the policing circuit of the present invention, the policing of the LAN interconnection service is attained by merely setting the content of the truth tables shown in FIGS. 8 to 10 as it is in the previous embodiments.

In the embodiments in which the policing circuit of the present invention is applied to the four communication services described above, three traffic monitor circuits, three determination circuits and three update circuits are provided and the monitor items and the determination patterns are selectively set to those circuits in accordance with the communication service so that the policing circuit compatible to the communication service is realized by using one circuit configuration. More traffic monitor circuits, determination circuits and update circuits may be required depending on the content of the communication service. However, in accordance with the present invention, by providing a maximum anticipated number of traffic monitor circuits, determination circuit and update circuits in the policing circuit as will be explained in the following embodiment, and providing dummy patterns for the communication service which uses a smaller number of circuits as it is in the previous embodiment, the compliance to various communication services is facilitated. Since the dummy circuits operate in parallel except a portion of the determination operation, the problem of delay due to the increase of the circuit operation in the communication service does not take place.

Figure 20:
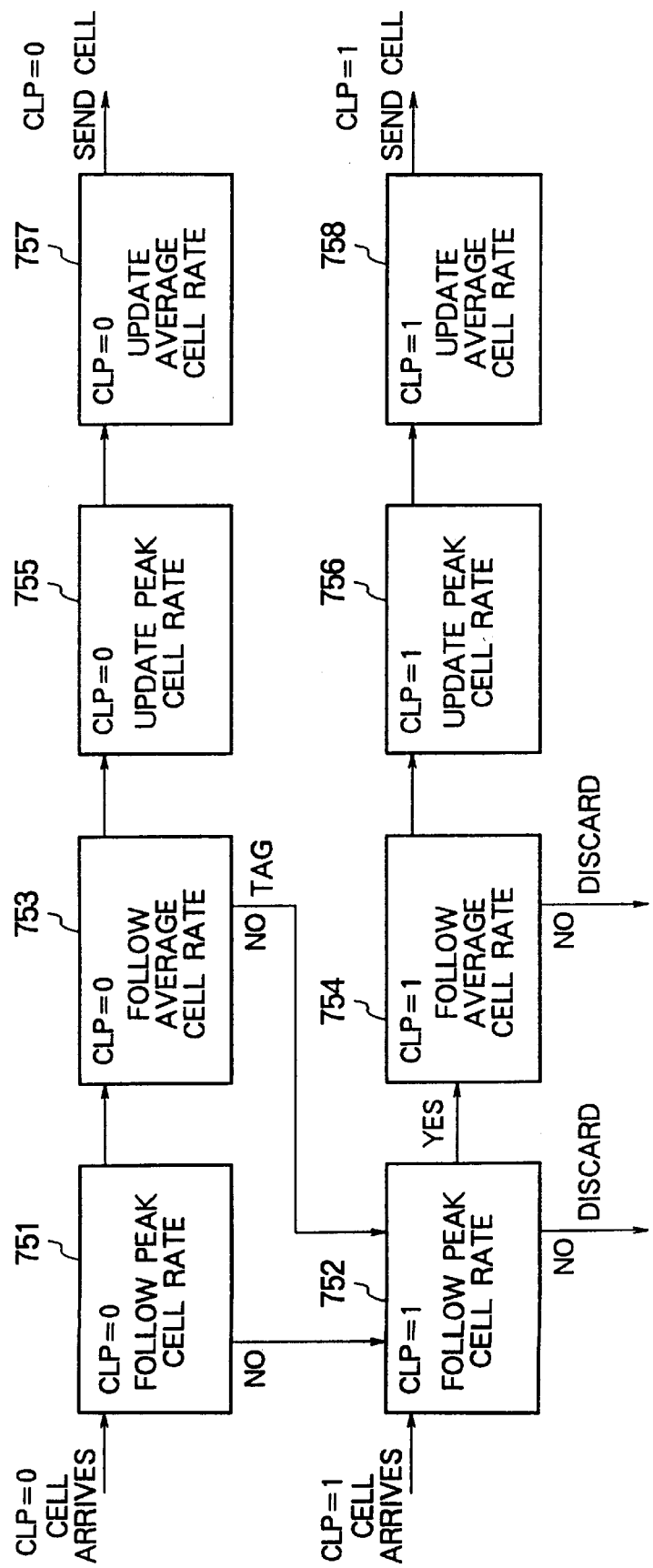
FIG. 20 shows monitor state items of a variable bit rate service.
Figure 21:
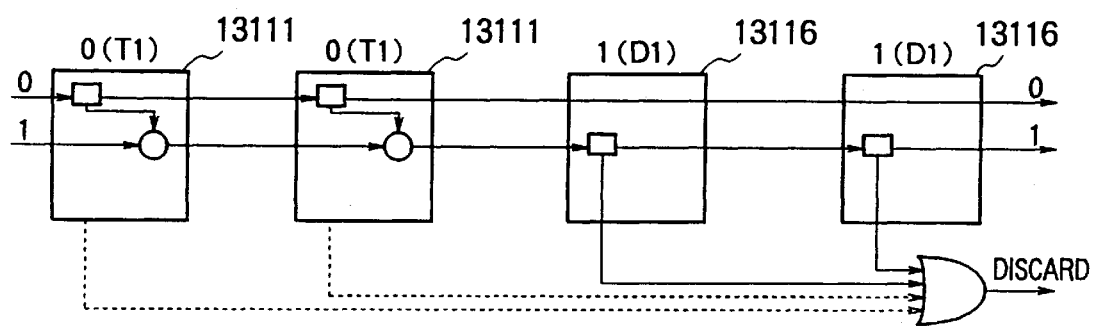
FIG. 21 shows a connection of the determination circuit when the policing circuit of the present invention conducts the variable bit rate service.
Figure 22:
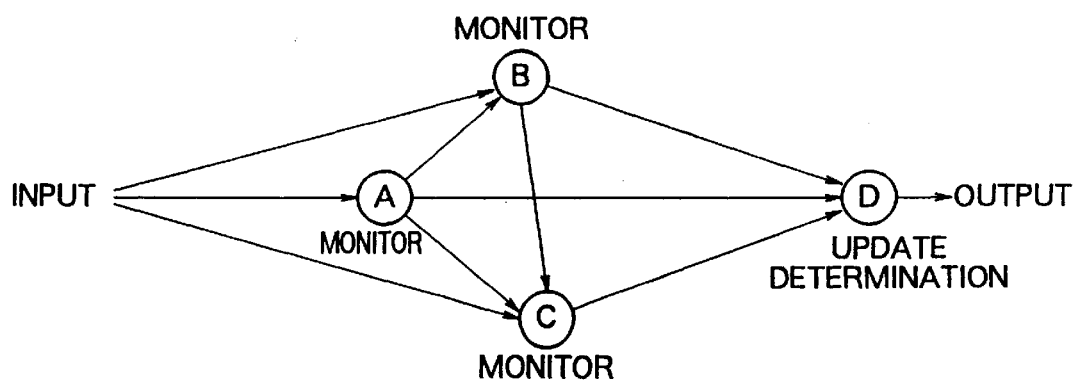
FIG. 22 shows a general conceptual view illustrating the dependency of the monitor state item in the policing conducted in the communication service provided in the ATM communication network.
Figure 23:
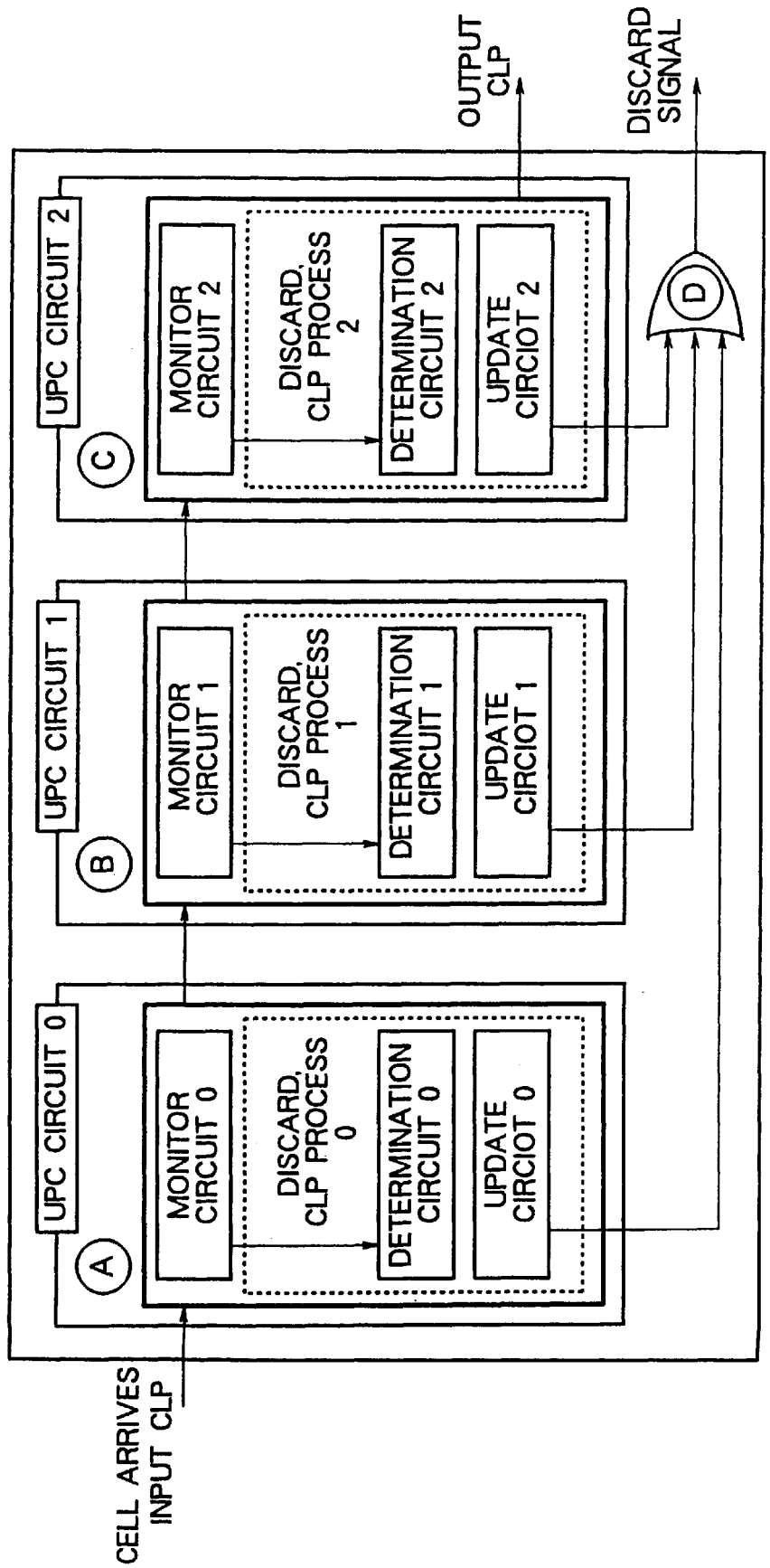
FIG. 23 shows a general configuration of the policing circuit for realizing the communication service shown in FIG. 22.
Figure 24:
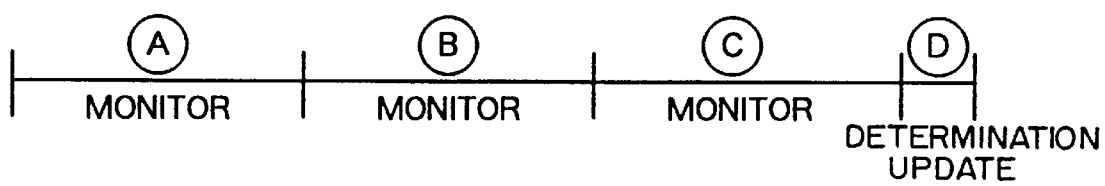
FIG. 24 shows an operation sequence of the policing circuit shown in FIG. 23.

An embodiment in which the variable bit rate service is attained by four traffic monitor circuits 11, four determination circuits 131 and four update circuits 138 as shown in FIG. 4 is explained. FIG. 20 shows a pattern of the monitor items to be monitored in the variable bit rate service (VBR) and the monitor state item 139. In order to conduct the policing of the VBR, the monitor state item 139 of the VBR is selected from the determination types 1311 which are set in the traffic parameter 40 and it is set in the determination circuit 131. Specifically, the determination type 1311 is selected as shown in FIG. 21 to form the total determination circuit 13. In the monitor circuit, the peak cell rate of the cell arrived with CLP=0, the peak cell rate of the cell arrived with CLP=1 and the average rate thereof are monitored by the four monitor circuits. The setting method of the monitor items is same as that of the previous embodiments. For the cell arrived with CLP=0, the peak cell rate violation is determined by the first stage determination circuit by the condition of CLP=0, and the permitted cell is determined for the average rate violation in the second stage determination circuit by the condition of CLP=0. Of the cells arrived with CLP=0, the cells determined as violation in the first or second stage are tagged. The cells tagged in the first or second stage and the cells arrived with CLP=1 are determined for the peak cell rate violation and the average rate violation in the third or fourth stage determination circuit, respectively. When the violation is detected, the cell is discarded. Namely, in the present policing circuit 10 in FIG. 4, the first stage monitors the peak cell rate of the cell arrived with CLP=0 by the traffic monitor circuit 11a, the second stage monitors the average rate of the cell arrived with CLP=0 by the traffic monitor circuit 11b, the third stage monitors the peak cell rate of the cell arrived with CLP=1 by the traffic monitor circuit 11c, and the fourth stage monitors the average rate of the cell arrived with CLP=1 by the traffic monitor circuit 11d. Those monitor results are inputted to the total determination circuit 13. The total determination circuit 13 selects 0 (T1) 13111 as the determination circuit 131a, 0 (T1) 13111 as the determination circuit 131b, 1 (D1) 13116 as the determination and 1 (D1) 13116 as the determination circuit 131d.

Figure 25:
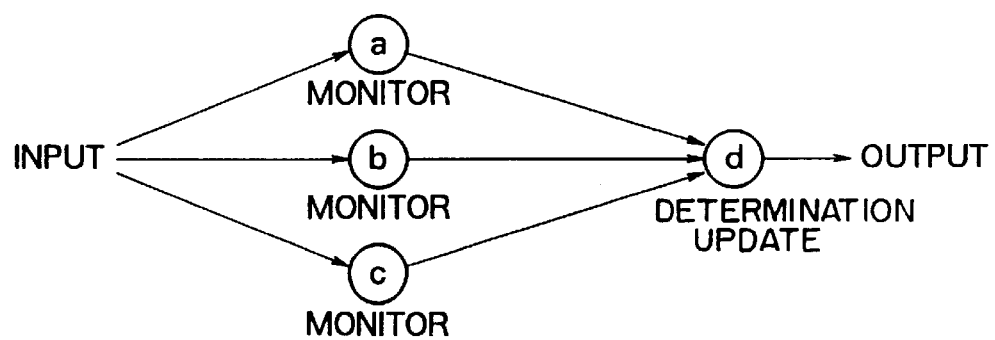
FIG. 25 shows concept of the dependency of the monitor state item in the policing method of the present invention.
Figure 26:
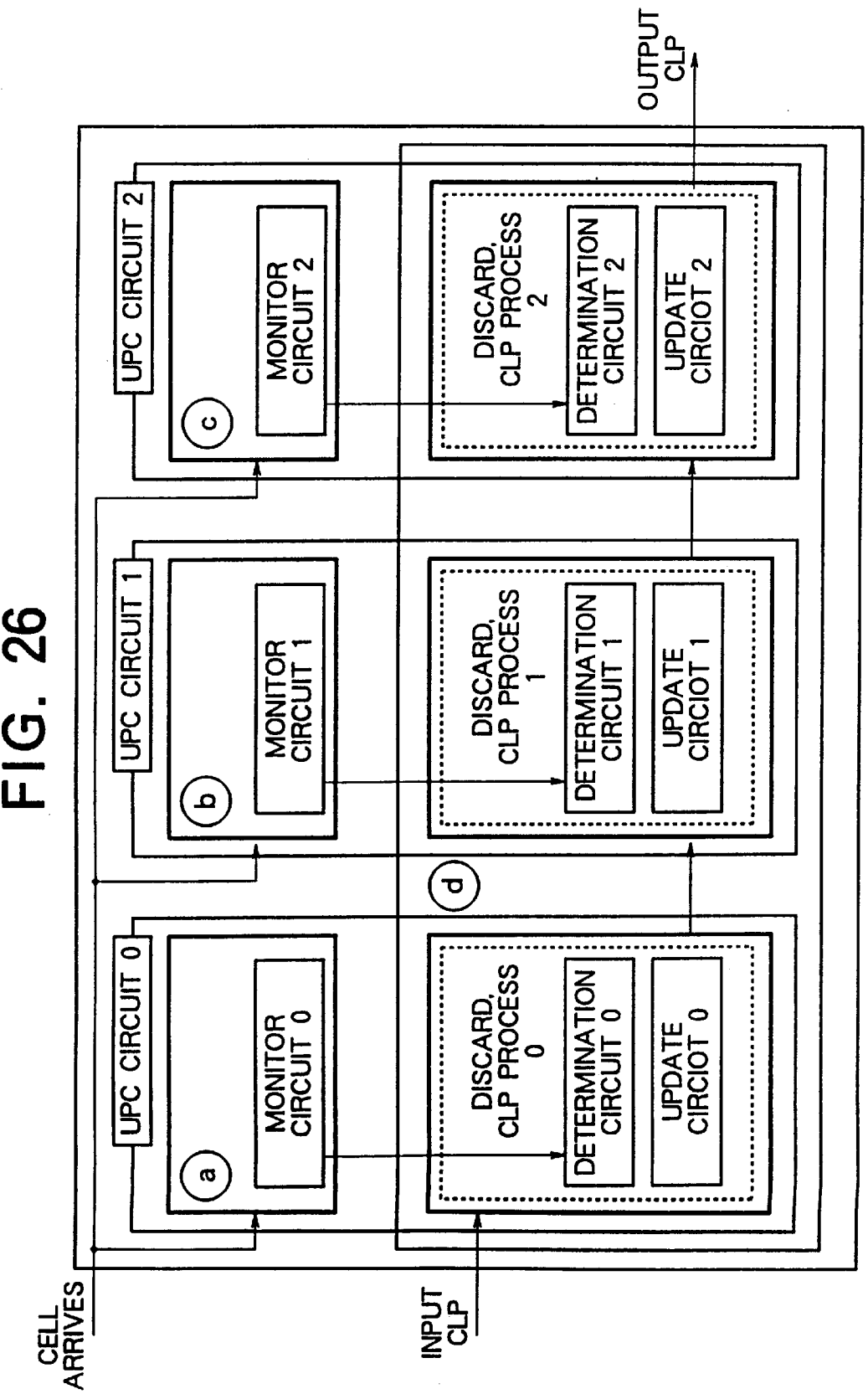
FIG. 26 shows a configuration of the policing circuit for realizing the policing method of the present invention shown in FIG. 25.
Figure 27:
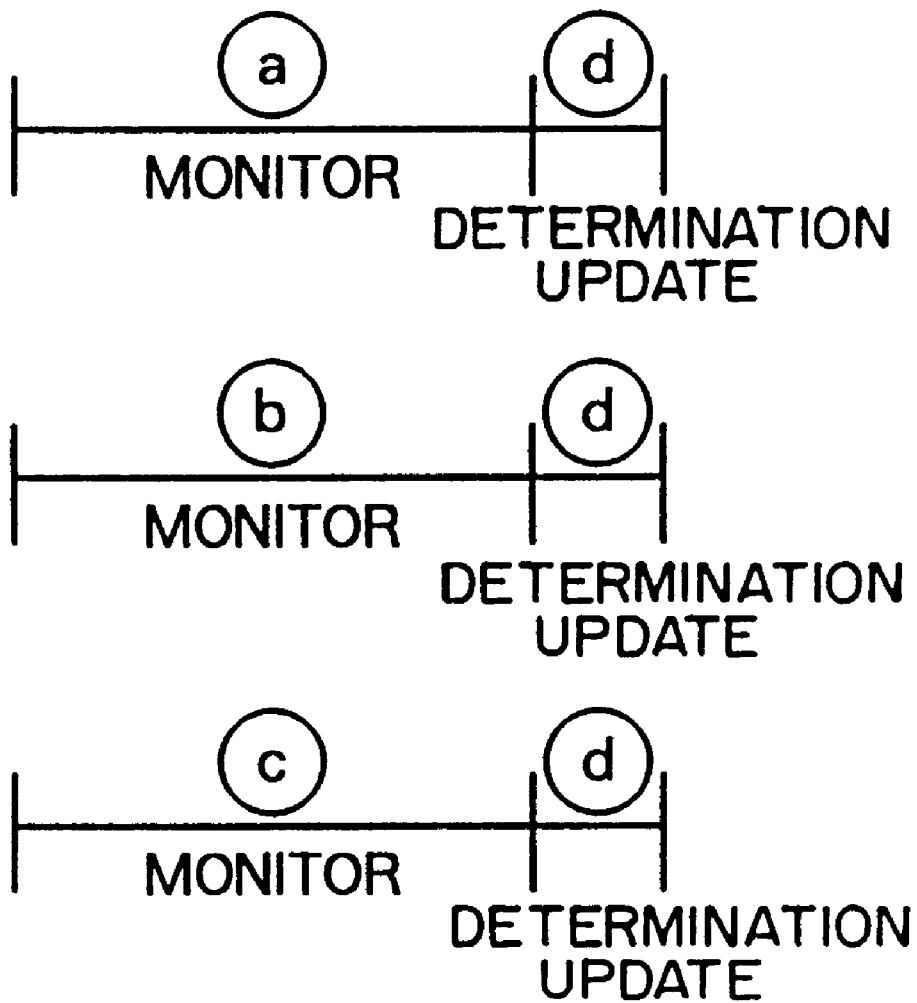
FIG. 27 shows an operation sequence of the policing circuit shown in FIG. 26.

As described in connection with the embodiments, in accordance with the policing method and policing circuit of the present invention, in the policing for the communication service having a plurality of monitor items with predetermined determination order, the traffic monitor circuits are independently arranged as shown in FIGS. 25 and 26 and the total determination circuit is coupled separately from the determination circuits, the update circuits and the monitor circuits which have the determination order. Thus, the long process time traffic monitoring in the complex policing (for example, the policing having N monitor items) can be conducted in parallel and the policing process can be conducted in the same time as that for the policing of one monitor item as shown in FIG. 27, and the policing with less cell delay which is suitable for the high speed and wide band communication is attained. By arranging sufficient number of monitor circuits, determination circuits and update circuits necessary for the policing and setting necessary parameters in the respective circuits in accordance with the communication service, the policing circuit which does not need to add the hardware circuits and can provide economic multi-services is attained.

What is claimed is:

1. An asynchronous transfer mode (ATM) communication apparatus in an ATM network, comprising:
   a plurality of monitor circuits for independently monitoring in parallel traffic of an input cell by using traffic parameters for a peak cell rate or traffic parameters for an average cell rate; and
   a plurality of determination circuits for determining whether or not the input cell should be tagged, discarded or permitted for input against another ATM communication apparatus from the ATM communication apparatus in accordance with a cell processing rule determined for communication service to be provided by the ATM network by using outputs of said monitor circuits and identification information included in input traffic information, wherein a cell which arrived at the ATM communication apparatus is outputted to another ATM communication apparatus with no change or outputted after being tagged or discarded.

2. An asynchronous transfer mode (ATM) communication apparatus in an ATM network, comprising:
   a plurality of monitor circuits for independently monitoring in parallel traffic of an input cell by using traffic parameters for a peak cell rate or traffic parameters for an average cell rate, said plurality of monitor circuits being provided in parallel; and
   a plurality of determination circuits for determining whether or not the input cell should be tagged, discarded or permitted for input against another ATM communication apparatus from the ATM communication apparatus in accordance with a cell processing rule determined for communication service to be provided by the ATM network by using outputs of said monitor circuits and identification information included in input traffic information, said plurality of determination circuits being provided in parallel wherein a cell which arrived at the ATM communication apparatus is outputted to another ATM communication apparatus with no change or outputted after being tagged or discarded.

3. An asynchronous transfer mode (ATM) communication apparatus in an ATM network, comprising:
   a plurality of monitor circuits for independently monitoring in parallel traffic of an input cell by using traffic parameters for a peak cell rate or traffic parameters for an average cell rate;
   a plurality of determination circuits for determining whether the input cell should be tagged, discarded or permitted for input against another ATM communication apparatus from the ATM communication apparatus in accordance with a cell processing rule determined for communication service to be provided by the ATM network by using outputs of said monitor circuits and identification information included in input traffic information; and
   a plurality of update means corresponding to said plurality of monitor circuits for updating a monitored result of a connection which belongs to said input cell in accordance with said cell processing rule by using said outputs of said monitor circuits and said determination circuits, wherein a cell which arrived at the ATM communication apparatus is outputted to another ATM communication apparatus with no change or outputted after being tagged or discarded.

4. An asynchronous transfer mode (ATM) communication apparatus in an ATM network, comprising:
   a plurality of monitor circuits for independently monitoring in parallel traffic of an input cell by using traffic parameters for a peak cell rate or traffic parameters for an average cell rate, said plurality of monitor circuits being provided in parallel;
   a plurality of determination circuits for determining whether or not the input cell should be tagged, discarded or permitted for input against another ATM communication apparatus from the ATM communication apparatus in accordance with a cell processing rule determined for communication service to be provided by the ATM network by using outputs of said monitor circuits ant identification information included in input traffic information, said plurality of determination circuits being provided in parallel; and
   a plurality of update means corresponding to said plurality of monitor circuits for updating a monitored result of a connection which belongs to said input cell in accordance with said cell processing rule by using said outputs of said monitor circuits and said determination circuits, said plurality of update means being provided in parallel, wherein a cell which arrived at the ATM communication apparatus is outputted to another ATM communication apparatus with no change or outputted after being tagged or discarded.

5. An asynchronous transfer mode (ATM) communication apparatus in an ATM network, comprising:
   a plurality of monitor circuits for independently monitoring in parallel traffic of an input cell; and a plurality of determination circuits for determining whether the input cell should be tagged, discarded or permitted for input based on outputs of said monitor circuits, wherein a policing of an input cell regulated under a Switched Multi-megabit Data Service (SMBS) is performed.

6. An asynchronous transfer mode (ATM) communication apparatus in an ATM network, comprising:

a plurality of monitor circuits for independently monitoring in parallel traffic of an input cell; and a plurality of determination circuits for determining whether the input cell should be tagged, discarded or permitted for input based on outputs of said monitor circuits, wherein a policing of an input cell regulated under a Frame Relay Service (FRS) is performed.

7. An asynchronous transfer mode (ATM) communication apparatus in an ATM network, comprising:

a plurality of monitor circuits for independently monitoring in parallel traffic of an input cell; and a plurality of determination circuits for determining whether the input cell should be tagged, discarded or permitted for input based on outputs of said monitor circuits, wherein a policing of an input cell regulated under a Constant Bit Rate Service (CBR) is performed.

8. An asynchronous transfer mode (ATM) communication apparatus in an ATM network, comprising:

a plurality of monitor circuits for independently monitoring in parallel traffic of an input cell; and a plurality of determination circuits for determining whether the input cell should be tagged, discarded or permitted for input based on outputs of said monitor circuits, wherein a policing of an input cell regulated under a Local Area Network (LAN) interconnection service is performed.

9. An asynchronous transfer mode (ATM) communication apparatus in an ATM network, comprising:

a plurality of monitor circuits for independently monitoring in parallel traffic of an input cell; and a plurality of determination circuits for determining whether the input cell should be tagged, discarded or permitted for input based on outputs of said monitor circuits, wherein a policing of an input cell regulated under a Variable Bit Rate Service (VBR) is performed.

10. An asynchronous transfer mode (ATM) communication apparatus in an ATM network, comprising:

a plurality of monitor circuits for independently monitoring in parallel traffic of an input cell;

a plurality of determination circuits for determining whether the input cell should be tagged, discarded or permitted for input based on outputs of said monitor circuits; and means for setting monitoring items of said traffic and determination rules to each of said monitor circuits and said determination circuits, wherein a policing under any one of a Switched Multi-megabit Data Service (SMDS), a Frame Relay Service (FRS), a Constant Bit Rate Service (CBR), a Local Area Network (LAN) interconnection service and a Variable Bit Rate Service (VBR) is selected and performed for each connection.

11. A policing circuit in an asynchronous transfer mode network comprising:

a plurality of monitor circuits which independently monitor in parallel traffic of an input cell for each of a plurality of monitoring items; and a plurality of determination circuits corresponding to said monitor circuits, each determination circuit receives the output of a corresponding monitor circuit and cell identification information contained in the input cell to determine whether the input cell of the asynchronous transfer mode network is to be tagged, discarded or permitted for input in accordance with a cell processing rule determined for communication service to be provided by the asynchronous transfer mode network, said cell processing rule being registered in response to an input.

12. A policing circuit in an asynchronous transfer mode network comprising:

a plurality of monitor circuits arranged in parallel which independently monitor in parallel traffic of an input cell for each of a plurality of monitoring items; and a plurality of determination circuits corresponding to said monitor circuits, each determination circuit receive the output of a corresponding monitor circuit and cell identification information to determine whether the input cell is to be tagged, discarded or permitted for input in accordance with a cell processing rule determined for communication service to be provided by the asynchronous transfer mode network, said cell processing rule being registered in response to an input.

13. A circuit according to claim 12 wherein said determination circuits each has a register which stores a cell processing rule, and a cell processing rule determined by the communication service provided by the asynchronous transfer mode network is set in said register.

14. A policing circuit according to claim 13 wherein said register is formed by a memory which uses the output of a monitor circuit corresponding to a determination circuit and the cell identification information as an address and sets the output of a determination result by the cell processing rule determined for the communication service as data.

15. A policing circuit according to claim 12 wherein a cell processing rule defines a determination order of outputs of said monitor circuits and a process for tagging, discarding or permitting input of the input cell.

16. A policing circuit according to claim 12 wherein said policing circuit includes at least three monitor circuits and three determination circuits and conducts the policing for at least one of switched multi-megabit data service, a frame relay service, a constant bit rate service and a LAN interconnection service.

17. A policing circuit according to claim 12 wherein said policing circuit includes at least four monitor circuits and four determination circuits and conducts the policing for at least a variable bit rate service.

18. A policing circuit in an asynchronous transfer mode network comprising:

a plurality of monitor circuits arranged in parallel which independently monitor in parallel traffic of an input cell for each of a plurality of monitoring items determined for a communication service provided by the asynchronous transfer mode network; and a plurality of determination circuits corresponding to said monitor circuits, each determination circuit receives the output of a corresponding monitor circuit and cell identification information to determine whether the input cell is to be tagged, discarded or permitted for input in accordance with a cell processing rule determined for communication service to be provided by the asynchronous transfer mode network, said cell processing rule being registered in response to an input; and a plurality of update circuits corresponding to said monitor circuits, each update circuit receives the output of a corresponding monitor circuit and the output of a corresponding determination circuit to update the traffic state of the input cell in accordance with the cell processing rule.

19. A policing circuit according to claim 18 wherein said update circuits each has a register which stores a cell processing rule, said cell processing rule determined for the communication service provided by the asynchronous transfer mode network is set in said register.

20. A policing circuit according to claim 19 wherein said register is formed by a memory which uses the output of a monitor circuit and the output of a corresponding determination circuit as an address and sets the output signal of a traffic state update of the input cell by the cell processing rule determined for the communication service as data.

21. A policing circuit in an asynchronous transfer mode network comprising:

a memory which stores a state of traffic of an input cell;

a plurality of monitor circuits arranged in parallel which independently monitor in parallel traffic of an input cell for each of a plurality of monitoring items;

a plurality of determination circuits corresponding to said monitor circuits, each determination circuit receives the output of a corresponding monitor circuit and cell identification information to determine whether the input cell is to be tagged, discarded or permitted for input in accordance with a cell processing rule determined for communication service to be provided by the asynchronous transfer mode network, said cell processing rule being registered in response to an input; and a plurality of update circuits corresponding to said monitor circuits, each update circuit receives the output of a corresponding monitor circuit and the output of a corresponding determination circuit to update the traffic state of the input cell in accordance with the cell processing rule.

22. A policing circuit in an asynchronous transfer mode network comprising:

a memory which stores a state of traffic of an input cell, a plurality of traffic monitor items of the input cell determined for a communication service provided by the asynchronous transfer mode network and a cell processing rule;

a plurality of monitor circuits arranged in parallel which independently monitor in parallel traffic of an input cell for each of a plurality of monitoring items;

a plurality of determination circuits corresponding to said monitor circuits, each determination circuit receives the output of a corresponding monitor circuit and cell identification information to determine whether the input cell is to be tagged, discarded or permitted for input in accordance with a cell processing rule being registered in response to an input; and a plurality of update circuits corresponding to said monitor circuits, each update circuit receives the output of a corresponding monitor circuit and the output of a corresponding determination circuit to update the traffic state of the input cell in accordance with the cell processing rule.

23. A policing circuit according to claim 22 wherein said determination circuits each has a register which stores a cell processing rule, said cell processing rule determined for the communication service held in said register is set in said register.

24. A policing circuit according to claim 22 wherein said update circuits each has a register which stores a cell processing rule, said cell processing rule determined for the communication service held in said register is set in said register.

25. A policing circuit in an asynchronous transfer mode network comprising:

a memory which stores a state of traffic of an input cell, a plurality of traffic monitor items of a plurality of input cells determined for a communication services to be provided by the asynchronous transfer mode network and a plurality of cell processing rules;

a plurality of monitor circuits arranged in parallel which independently monitor in parallel traffic of an input cell for each of a plurality of monitoring items in accordance with a selected traffic monitor item of the input cell read from said memory means;

a plurality of determination circuits corresponding to said monitor circuits, each determination circuit receives the output of a corresponding monitor circuit and cell identification information to determine whether the input cell is to be tagged, discarded or permitted for input in accordance with a selected cell processing rule determined for communication service to be provided by the asynchronous transfer mode network and read from said memory, said cell processing rule being registered in said memory in response to an input; and a plurality of update circuits corresponding to said monitor circuits, each update circuit receives the output of a corresponding monitor circuit and the output of a corresponding determination circuit to update the traffic state of the input cell in accordance with the cell processing rule.

26. A policing circuit in a asynchronous transfer mode network comprising:

monitor apparatus which independently monitors in parallel traffic of an input cell; and determination apparatus which receives the output of said monitor apparatus and cell identification information contained in the input cell to determine whether the input cell of the asynchronous transfer mode network is to be tagged, discarded or permitted for input in accordance with a cell processing rule determined for communication service to be provided by the asynchronous transfer mode network;

wherein said monitor apparatus comprises:

a plurality of monitor circuits being arranged in parallel, each monitor circuit having a register which stores a plurality of traffic monitor items of the input cell, and said traffic monitor items of the input cell determined for the communication service to be provided by the asynchronous transfer mode network are set in said register.

27. A policing circuit in an asynchronous mode network comprising:

input apparatus which inputs priority information on traffic contained in a header portion of an input cell to the asynchronous transfer mode network and independently monitoring in parallel results of at least one of a plurality of traffic monitor circuits; and determination apparatus which performs in parallel, determination processes to determine whether the input cell to the asynchronous transfer mode network is to be tagged, discarded or permitted for input in accordance with a cell processing rule determined for communication service to be provided by the asynchronous transfer mode network depending on the priority information and the monitoring results from said input apparatus, said cell processing rule being registered in response to an input.

28. A policing circuit in an asynchronous transfer mode network comprising:

input apparatus which inputs priority information on traffic contained in a header portion of an input cell to the asynchronous transfer mode network and independently monitoring in parallel results of a plurality of traffic monitor circuits; and a plurality of determination circuits arranged in parallel, so as to correspond to each of said plural traffic monitor circuits;

wherein tagging, discard or permission to input the input cell of the asynchronous transfer mode network is determined based on said priority information and the monitoring results from said input apparatus.

29. A policing circuit in an asynchronous transfer mode network comprising:

input apparatus which inputs priority information on traffic contained in a header portion of an input cell to the asynchronous transfer mode network and independently monitoring in parallel results of at least one of a plurality of traffic monitor circuits;

determination apparatus which performs in parallel determination processes to determine whether the input cell to the asynchronous transfer mode network is to be tagged, discarded or permitted for input in accordance with a cell processing rule determined for communication service to be provided by the asynchronous transfer mode network depending on the priority information and the monitoring results from said input apparatus, said cell processing rule being registered in response to an input;

a memory which stores a traffic state of the cell; and a plurality of update circuits which updates contents of said memory in accordance with an output of said determination apparatus.

30. A policing circuit in an asynchronous transfer mode network comprising:

input apparatus which inputs priority information on traffic contained in a header portion of an input cell to the asynchronous transfer mode network and independently monitoring in parallel results of a plurality of traffic monitor circuits;

a plurality of determination circuits arranged in parallel, so as to correspond to each of said plural traffic monitor circuits;

a memory which stores a traffic state of the input cell; and a plurality of update circuits which update contents of said memory in accordance with an output of said determination circuits;

wherein tagging, discard or permission to input the input cell to the asynchronous transfer mode network is determined by said determination circuits and the traffic state is updated by said update circuits in accordance with the priority information and the monitoring results from said input apparatus.

31. A policing circuit in an asynchronous transfer mode network comprising:

a first terminal which inputs priority information on traffic contained in a header portion of an input cell to the asynchronous transfer mode network;

a second terminal which inputs information on a cell processing rule determined for communication service to be provided by the asynchronous transfer mode network;

determination apparatus which determines whether the input cell to the asynchronous transfer mode network is to be tagged, discarded or permitted for input based on said information inputted from said first and second terminals;

a third terminal which outputs an output of said determination apparatus;

wherein said determination apparatus independently monitors in parallel the input cell to the asynchronous transfer mode network and outputs information as to tag, discard or permit to input the input cell in accordance with the cell processing rule.

32. A policing circuit in an asynchronous transfer mode network comprising:

a first terminal which inputs priority information on traffic contained in a header portion of an input cell to the asynchronous transfer mode network;

a second terminal which inputs information on a cell processing rule determined for communication service to be provided by the asynchronous transfer mode network;

a memory which stores a traffic state of the cell;

a third terminal which inputs and outputs the traffic state of the cell;

determination apparatus which determines whether the input cell to the asynchronous transfer mode network is to be tagged, discarded or permitted for input; and a fourth terminal which outputs an output of said determination apparatus;

wherein said determination apparatus independently monitors in parallel the input cell to the asynchronous transfer mode network and outputs information as to tag, discard or permit to input the input cell in accordance with the cell processing rule and the traffic state of the cell after the determination.

33. A policing circuit in an asynchronous transfer mode network comprising:

a first terminal which inputs priority information on traffic contained in a header portion of an input cell to the asynchronous transfer mode network;

a second terminal which inputs information on a cell processing rule determined for communication service to be provided by the asynchronous transfer mode network;

a memory which stores a traffic state of the cell and a cell processing rule determined for the communication service;

a third terminal which inputs and outputs the traffic state of the cell and the cell processing rule;

determination apparatus for which determines whether the input cell to the asynchronous transfer mode network is to be tagged, discarded or permitted for input; and a fourth terminal which outputs an output of said determination apparatus;

wherein said determination apparatus independently monitors in parallel the input cell to the asynchronous transfer mode network and outputs information as to tag, discard or permit to input the input cell in accordance with the cell processing rule and the traffic state of the cell after the determination.

34. A policing method in an asynchronous transfer mode network comprising the steps of:

inputting a cell;

monitoring traffic of the input cell for a plurality of items independently and in parallel wherein said monitoring step comprises the steps of:

receiving CLP contained in the input cell and a result of said monitoring step and determining a process for the input cell in accordance with a determination rule for communication service to be provided by the asynchronous transfer mode network; and tagging, discarding or passing the input cell through the asynchronous transfer mode network based on said determining step.

35. A policing method according to claim 34 further comprising the steps of:

storing a traffic state of the input cell; and updating the stored traffic state by a result of said determining step.

36. An asynchronous transfer mode (ATM) communication apparatus in an ATM network, comprising:

a first monitor circuit which independently monitors a peak cell rate of an input cell having first priority information;

a first determination circuit which determines permission or tagging of said input cell based on an output of said first monitor circuit;

a second monitor circuit which independently monitors an average cell rate of an input cell which was determined to be permitted in said first determination circuit;

a second determination circuit which determines permission or tagging of an input cell which was determined to be permitted in said first determination circuit based on an output of said second monitor circuit;

a third monitor circuit which monitors a peak cell rate of an input cell which was determined to be tagged in said first or second determination circuit or an input cell having second priority information;

a third determination circuit which determines permission or discard of said input cell based on an output of said third monitor circuit;

a fourth monitor circuit which independently monitors an average cell rate of an input cell which was determined to be permitted in said third determination circuit;

wherein said monitor circuits operate in parallel and a circuit which determines permission or tagging of an input cell which was determined to be permitted in said third determination circuit based on an output of said fourth monitor circuit.

37. A policing circuit in an asynchoronous transfer mode (ATM) network, comprising:

a first monitor circuit which independently monitors a peak cell rate of an input cell having first priority information;

a first determination circuit which determines permission or tagging of said input cell based on an output of said first monitor circuit;

a second monitor circuit which independently monitors an average cell rate of an input cell which was determined to be permitted in said first determination circuit;

a second determination circuit which determines permission or tagging of an input cell which was determined to be permitted in said first determination circuit based on an output of said second monitor circuit;

a third monitor circuit which independently monitors a peak cell rate of an input cell which was determined to be tagged in said first or second determination circuit or an input cell having second priority information;

a third determination circuit which determines permission or discard of said input cell based on an output of said third monitor circuit;

a fourth monitor circuit which independently monitors an average cell rate of an input cell which was determined to be permitted in said third determination circuit;

wherein said monitor circuits operate in parallel and a circuit which determines permission or tagging of an input cell which was determined to be permitted in said third determination circuit based on an output of said fourth monitor circuit.

38. An asynchronous transfer mode (ATM) communication apparatus in an ATM network, comprising:

an input circuit which inputs a cell having first priority information or second priority information;

a plurality of monitor circuits which independently monitor in parallel a peak cell rate or an average cell rate of a cell input from said input circuit; and a plurality of determination circuits which determine permission of a cell having said first priority information or change of said first priority information to said second priority information according to a predetermined peak cell rate or an average cell rate and determines permission or discard of an input cell having said second priority information according to a predetermined peak cell rate or an average cell rate based on outputs of said plurality of said monitor circuits.

39. A policing circuit in an asynchoronous transfer mode (ATM) network, comprising:

an input circuit which inputs a cell having first priority information or second priority information;

a plurality of monitor circuits which independently monitor in parallel a peak cell rate or an average cell rate of a cell input from said input circuit;

a plurality of determination circuits which determine permission of a cell having said first priority information or change of said first priority information to said second priority information according to a predetermined peak cell rate or an average cell rate and determine permission or discard of an input cell having said second priority information according to a predetermined peak cell rate or an average cell rate based on outputs of said monitor circuits; and an output circuit which outputs a cell which was determined to be permitted or tagged or control information necessary for processing of permission, tagging or discard of said input cell based on determination results of said determination circuit.

* * * * *